INVENTORS
Solomon Spiegelman
Ichiro Haruna

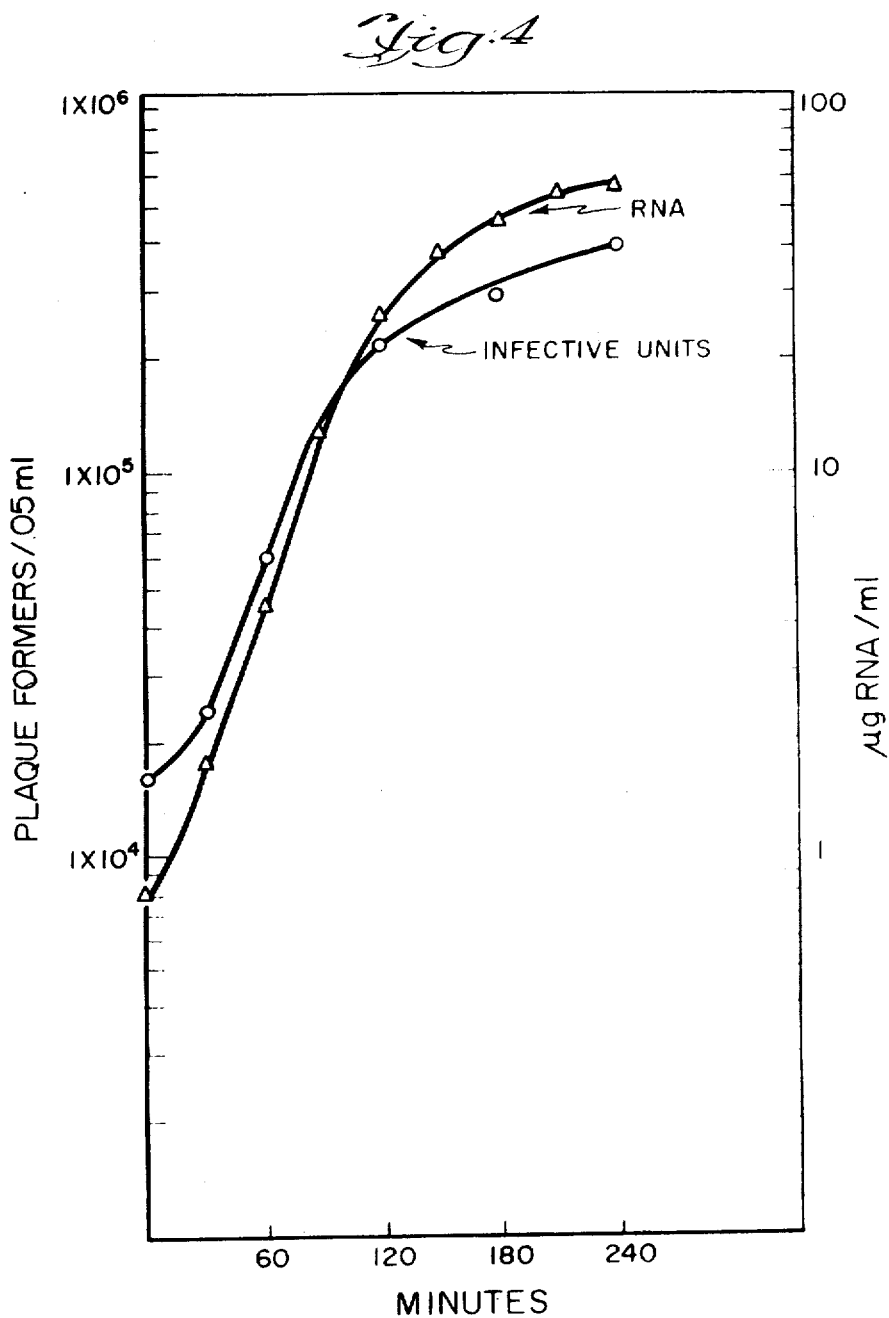

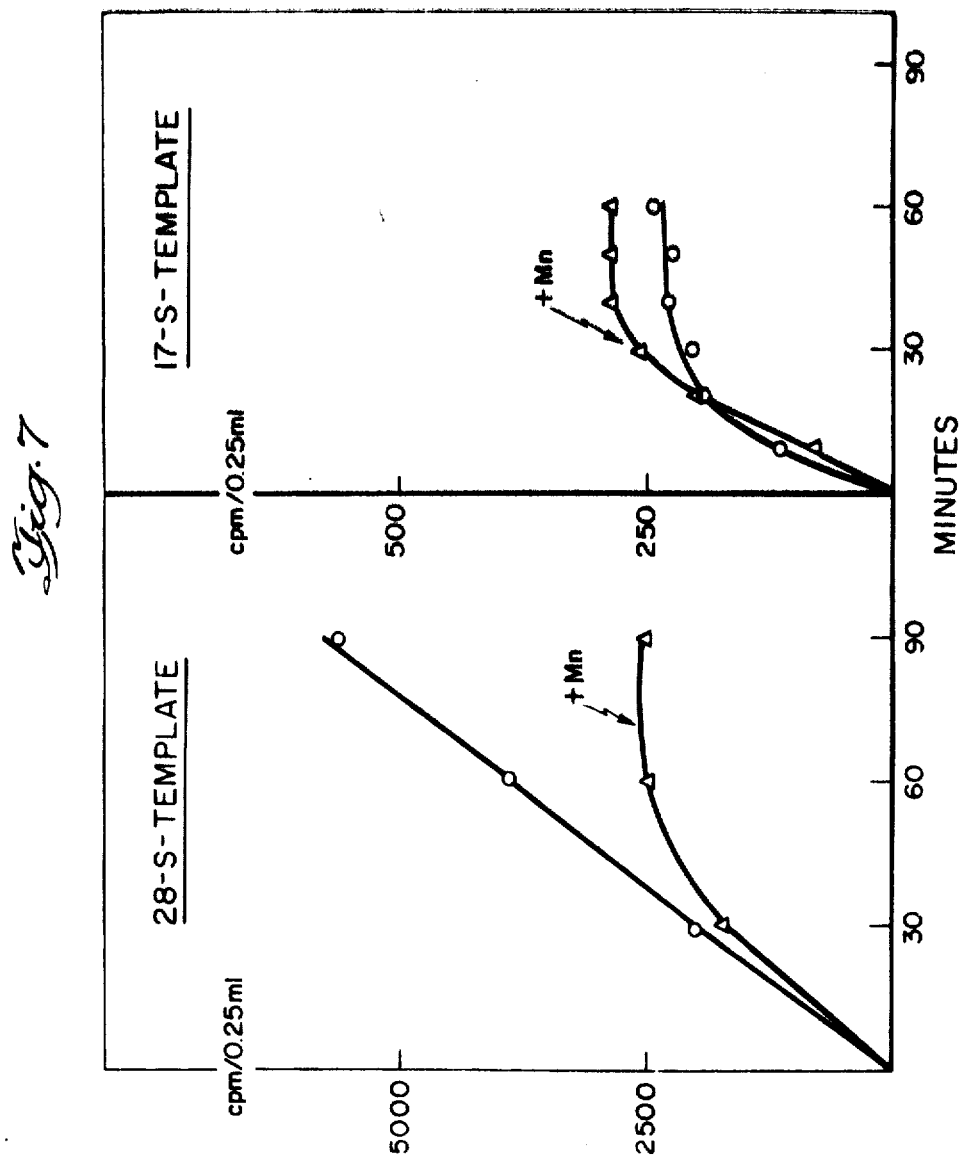

United States Patent Office 3,661,893
Patented May 9, 1972

3,661,893
SYNTHESIS IN VITRO OF NUCLEIC ACIDS AND PRODUCTS USED THEREIN AND PRODUCTS PRODUCED THEREFROM
Solomon Spiegelman and Ichiro Haruna, Champaign, Ill., assignors to University of Illinois Foundation, Urbana, Ill.
Continuation-in-part of application Ser. No. 509,485, Sept. 29, 1965, and a division of application Ser. No. 535,596, Mar. 18, 1966, now Patent No. 3,444,041, dated May 13, 1969. This application Nov. 25, 1968, Ser. No. 798,528
Int. Cl. C07d 51/50
U.S. Cl. 260—211.5 R        6 Claims

ABSTRACT OF THE DISCLOSURE

Biologically active ribonucleic acids are synthesized in vitro in an enzymatic system from nucleotide bases and a biologically active ribonucleic acid template.

---

Figure 1:
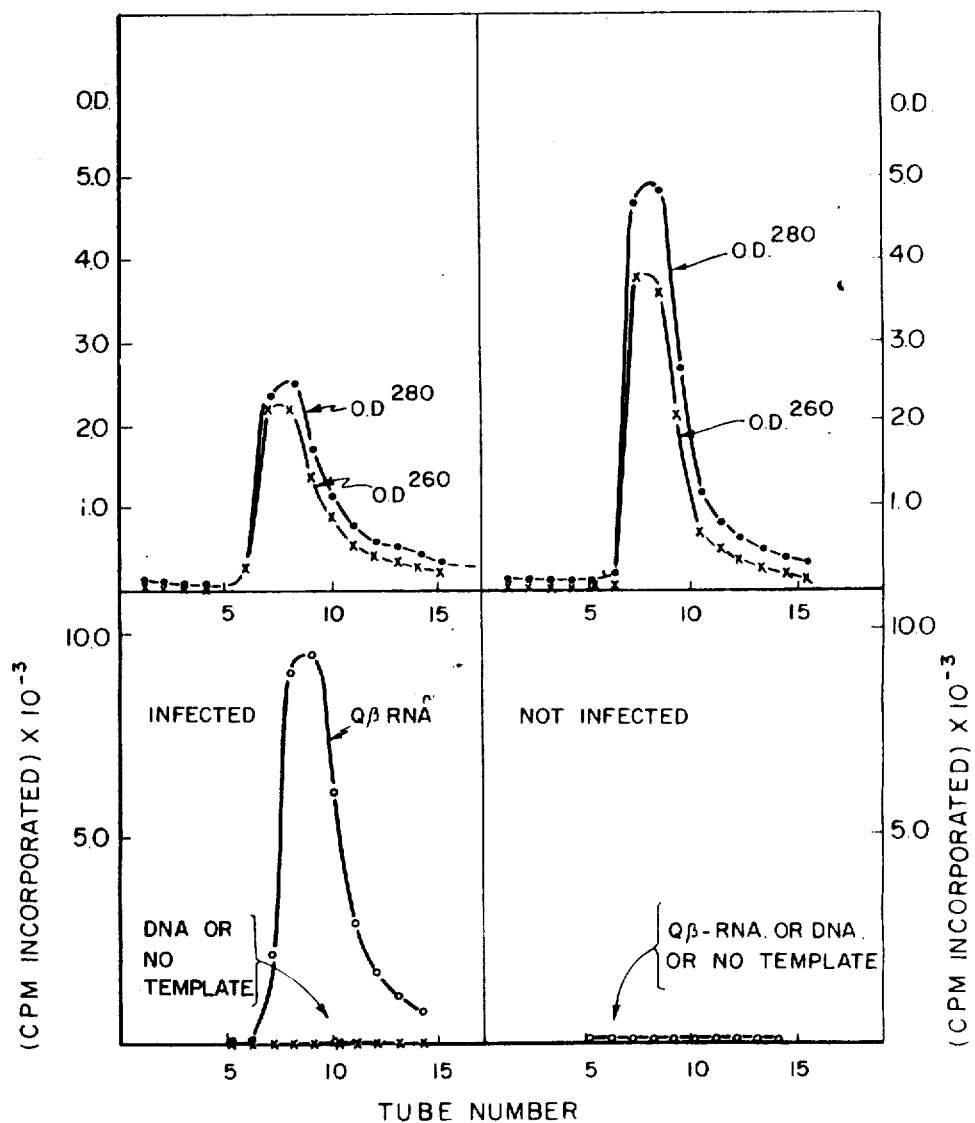

This is a continuation-in-part of our formerly copending application Ser. No. 509,485, filed Sept. 29, 1965, and now abandoned; and is a divisional application of our U.S. Pat. No. 3,444,041, issued May 13, 1969.

A United States Government contract or grant from or by the Public Health Service supported at least some of the work set forth herein.

As used herein, the term "biologically active" includes the basis for the assay procedure described, infra, namely, the production of infectious viran RNA, and, more generally, includes materials that possess genetically competent characteristics or information essential to life or processes thereof. These biologically active materials are genetically competent and can transmit information to a system that will follow their instructions and translate them into biological sense.

The term "phage" herein refers to bacteriophage.

This invention relates to methods and systems useful in the synthesis in vitro of biologically active nucleic acids and the isolation of such biologically active nucleic acids, the preparation of purified enzymic component of these systems and the resulting purified enzymic component which is free of detectable levels of degrading enzymes and enzyme inhibitors, and the biologically active nucleic acids produced therewith.

Living organisms, including humans, animals, plants, and micro-organisms, use biologically active nucleic acids in the processes of storing and transmitting translatable genetic or hereditary information or messages and in the synthesis of the large number of tissue and body proteins. Two nucleic acids which can function under proper conditions as transmitters of the genetic code are DNA (deoxyribonucleic acid) and RNA (ribonucleic acid). In the living oganism, these nucleic acids are generally combined with proteins to form nucleoproteins.

These DNA and RNA molecules consist of comparatively simple constituent nucleotides (nitrogen base, pentose sugar moiety, and phosphate groups) polymerized into chains containing hundreds to thousands of these nucleotide units generally linked together through chemical bonds formed between the constituent phosphate and sugar groups.

These nitrogen bases are classified as purines or pyrimidines. The pentose sugar is either ribose or deoxyribose. Phosphoric acid groups are common to both DNA and RNA. On complete hydrolysis, DNA and RNA yield the following compounds:

| DNA | RNA |
|---|---|
| Adenine (A) | Aldenine (A) |
| Cytosine (C) | Cytosine (C) |
| Guanine (G) | Guanine (G) |
| Thymine (T) | Uracil (U) |
| Methylcytosine | |
| Hydroxymethylcytosine | |
| Deoxyribose | Ribose |
| Phosphoric acid | Phosphoric acid |

It should be noted that the bases adenine (A), cytosine (C), and guanine (G) are common to both DNA and RNA, base thymine (T) of DNA is completely replaced by the base uracil (U) in RNA. Methylcytosine occurs in small amounts in various deoxyribonucleic acids of animal origin and in wheat germ. In the DNA of several bacteriophages, cytosine is completely replaced by hydroxymethylcytosine. In contrast to DNA, it has not been established that other bases exist in RNA molecules.

Hydrolysis of these nucleic acids under appropriate conditions liberates a group of compounds known as nucleotides; these nucleotides consist of a purine or pyrimidine bases linked to pentose sugar moiety, which sugar moiety is esterified with phosphoric acid. These nucleotides are the subunits from which polymeric nucleic acids are constructed.

The ribonucleic acid polynucleotide structure may be represented diagrammatically, for example, as follows:

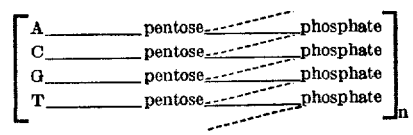

The dotted lines above represent ester groupings between one of the free hydroxyl groups of the pentose and of the phosphate groups. The subscript $n$ represents the number of repeating units which constitute the particular ribonucleic acid molecule.

Recent studies by chemists have shown that the DNA molecule has a doubly stranded chain which, when shown in three dimensions, has two chains intertwined in a double helix. Each chain consists of alternating nucleotides, there being ten nucleotides in each chain per rotation of the helix, this ten nucleotide chain being about 34 A. in length. Both chains are right handed helices. These helices are evidently held together by hydrogen bonds formed between the hydrogen, nitrogen, and oxygen atoms in the respective chains. The structure of the DNA molecule as it relates to the sequence of these bases in the molecule is now being elucidated; these structural studies are important, since it is now generally believed that this sequence of bases is the code by means of which the DNA molecule conveys or transmits its genetic information.

Chemists have shown that RNA generally is a single-stranded structure that has in its backbone the 5-carbon sugar ribose instead of the 5-carbon deoxyribose sugar found in DNA. As in DNA, the different nucleotides are linked together through the phosphate groups to form a long chain and thus to form an RNA molecule of high molecular weight. The RNA molecules do not seem to be as highly polymerized as the DNA molecules, and although there is evidence of hydrogen bonding between the RNA bases in some preparations, it is thought that no helical structure is involved. As with DNA, base sequence studies are now being made with RNA.

In genes, the repository of hereditary factors of living cells and viruses, specific genetic information resides in the nucleotide sequence appearing in the DNA and RNA molecules. These sequences are transmitted, encoded and reproduced in vivo by living organisms. When no modification of the DNA or RNA takes place an exact duplicate or replicate of the sequence is reproduced which in turn produces an exact duplicate or replicate of a particular protein molecule. If, however, a change takes place in the DNA or RNA molecules, which change can be mediated by some mechanism such as radiation, a foreign chemical reactant, etc., a "mutation" takes place wherein the altered DNA or RNA molecules duplicate or replicate the "new" DNA or RNA and these in turn produce new or altered proteins as dictated by the altered nucleotide structure.

We have discovered a method and controlled system for synthesizing in vitro biologically active nucleic acids using an initiating amount of intact, biologically active nucleic acid template, replicase and the requisite nucleotides. With this method, one may synthesize, for example aribonucleic acid molecule (RNA) identical with the intact template (the template is the model for replication) continuously over periods until or unless one aribitrarily or selectively stops the synthesis. This self-replication involves the true and complete transmission and translation from the intact template to the nucleotides, whereby the nucleotides are assembled structurally in the identical sequence that characterizes the intact template. The intact product synthesized may be either selectively labeled (e.g., radioactive) or non-labeled and in a form that is free of detectable impurities of other materials with which it is otherwise found in nature.

More specifically, we have discovered a controlled system that provides for the synthesis of intact, biologically active nucleic acid in an in vitro enzymatic system from nucleotides bases using a selected, intact, biologically active nucleic acid free of detectable levels of destructive material as a template (e.g., input template). When the system produces biologically active "replicas" (identical copies of the same molecular weight) of the nucleic acid template, the process shall be referred to as one involving "replication." The enzyme catalyst shall be referred to as a "polymerase" or "replicase"; when the enzyme catalyst is an RNA-dependent RNA polymerase, it is a "replicase."

Our process or system is particularly well suited for synthesizing in vitro biologically active ribonucleic acid (RNA) from ribonucleotide base components (substrates) having high bond energy, using an intact, homologous (contains the information for its specific replicase) biologically active RNA template, a homologous replicase that selectively recognizes the structural program or message of the template, has catalytic activity for the synthesis of intact biologically active RNA from ribonucleotides, and is entirely free of detectable levels of ribonuclease activity and detectable levels of other destructive enzymological activity, and using a cofactor that provides divalent ions which are not used up in the replicating system.

The particular translation by the replicase of the program of the template is dependent on factors that are discussed below.

The replicase for viral RNA is obtained either by introducing a selected virus particle (e.g., bacteriophage) free of any existing protective proteinaceous coating into an uninfected host bacterium cell to synthesize an enzyme that we believe does not pre-exist in the host cell, or, preferably, by introducing an intact bacteriophage (virus particle) into the bacterium cell to synthesize this enzyme.

The injected or intruding RNA has a structural program that produces a message that is translated into enzyme protein and is conserved during this translation. This enzyme, a homologous replicase (RNA-dependent RNA polymerase), is isolated from the altered cell and is then purified to remove detectable levels of the usual concurrent ribonuclease activity and other destructive enzymological activity which may be found in the virus cell system.

The resulting purified enzyme replicase discriminately recognizes the intact homologous RNA genome of its origin and requires it as a template for normal synthetic replication. Thus, the purified replicase exhibits a unique and selective dependence on and preference for its homologous viral RNA in exhibiting viral RNA-polymerizing (synthesizing and/or replicating) activity. The replicase exhibits the unique and valuable ability to provide the replication of only intact viral RNA and does not provide for the replication of fragments or foreign sequences or incomplete copies of its own genome. The term "genome" refers to the entire complement of genes in a cell. The genes provide a repository of genetic information for living cells and viruses.

The nucleotide bases or substrate components for viral RNA replication should have sufficiently high bond energy for replication. Satisfactory replication of viral RNA has been achieved with four riboside triphosphates, namely, adenosine triphosphate (ATP), guanosine triphosphate (GTP), cytidine triphosphate (CTP), and uridine triphosphate (UTP).

In replicating infectious viral RNA in vitro, we purified two different RNA replicases induced in a strain of *Escherichia coli* by two serologically distinct RNA bacteriophages. The enzyme protein preparations, described in further detail below, were effectively free of detectable levels of interfering ribonuclease, phosphorylase, and DNA-dependent RNA polymerase (transcriptase). These isolated enzymes (replicases) showed both a mandatory requirement for template RNA and an ability to mediate prolonged and extensive net synthesis of biologically active polyribonucleotide (RNA). The two replicases exhibited a unique discriminating selectively in their response to added RNA. Under otherwise optimal conditions, both replicases were virtually inactive with heterologous RNA, including ribosomal and s-RNA of the host. Neither replicase functioned when the other's RNA was used as a template. Each replicase only recognized the RNA of its origin and absolutely required it as a template for its synthetic activity.

There is good evidence that the replicase recognizes the particular sequence of nucleotides at the beginning and at the end of the biologically active viral RNA template during the course of replication. It is inferred from this recognition pattern that the intermediate portion of the RNA template is not essential to the direction of or instruction found in the replication mechanism studied by us. This suggests that the recognition sequences of nucleotides present at the beginning and end of a biologically active RNA template molelcule can be selectively bonded to otherwise non-biologically active or non-viral RNA to produce a synthesized biologically active RNA product. It is thought that theh RNA forms a circle and these two recognition sequences of the molecule overlap each other to provide double-stranded regions; such overlapped regions could afford, therefore, identification of the RNA molecule in a single, rapid scanning process.

An RNA template of an in vitro replicating system may be formed in situ. If one were, for example, to introduce foreign bases or nucleotides (e.g., analogues of known bases or nucleotides) into our replicating system, a mutant may be formed which would be the biologically active template for replication with those same bases or nucleotides; in such instances, one would be synthesizing mutants in vitro in a known way.

On a practical basis, the availability of our relatively pure replicase will allow the investigator to move into research areas not previously accessible. Thus we can now proceed to determine the effect of small or large changes in the replicase molecule upon its ability to synthesize RNA; and to determine the change in the biological activity of the RNA so produced by the altered replicase.

Being a protein and, therefore, made up of a series of amino acids, the structure of the replicase can now be studied, and the relation of its structure to the structure of the RNA produced can give important information, vis-a-vizs, structure-activity relationships. Since the replicase is a large molecule and subject to varying degrees of hydrolysis by chemical or enzymatic means, it will be of interest to determine the effect of such hydrolysis, whether they be comparatively minor or major, upon the biological activity of the molecule remaining. In addition, the protein molecule can be subjected to varying degrees of chemical change such as acetylation of its reactive amino or hydroxyl groups, halogenation, nitration, or sulfonation; reaction with nitrous acid should convert the free amino groups of the protein to hydroxyl groups, again with some change in activity.

Our discovery of a method to produce a pure biologically active RNA-dependent RNA polymerase should be useful in the study and/or preparation of products with anti-viral activity, anticancer activity, and hormone and/or enzyme activity. Such research could lead to important therapeutic advancements.

It is conceivable to project that an altered replicase might under certain conditions produce an altered RNA which in our system might possibly have altered virus properties or under ideal circumstances might have anti-virus properties. It may be possible to use this system by perhaps adding a new component to the bacteria-pure, RNA-virus system, which will result in a new replicase, which replicase system can be directed to produce anti-viral molecules.

In the production of a vaccine against a virus disease by present means, the virus is grown in a complex medium. Then by chemical or physical means is altered so that its disease producing ability becomes limited, the attenuated virus is then injected into an animal to produce antibodies. These antibodies are effective in neutralizing the activity of the attenuated virus and the original virus itself. Having large and almost unlimited amounts of the replicase available for a particular virus might be of help in the production of vaccines against the virus, for example, in the following paragraph.

The replicase per se on injection into an animal would be expected to replicate a virus particle and create the disease state. However, a replicase could induce, on injection into an animal, particles which could produce directly a form of the viral disease and to which the animal body could react by producing antibodies. In such a system, the altered replicase-animal system could produce antibodies directly avoiding the expensive and cumbersome system of present vaccine production.

In the reaction system discussed above, a replicase has been isolated. It is known that other disease causing viruses are also RNA molecules; for example, the viruses which cause tobacco and tomato mosaic disease, poliomyelitis, influenza, Newcastle Disease in poultry, and mumps, among others, are ribonucleic acid-containing proteins. Our discovery points to the possibility that replicases for each of these RNA viruses could conceivably be derived from an appropriate system. The synthesis in vitro of such replicases in pure form should be an amportant advance in the study of the biochemistry of the diseases and in the preparation of vaccines.

With a pure replicase in hand, it is possible to determine its particular amino acid structure. In addition, with the pure RNA in hand, it should be possible to determine the nucleotide sequence in the RNA, as well as its other structural characteristics. Determination of amino acid structure and coding to give the particular RNA nucleotide sequence should be of importance in elucidating amino acid and nucleotide sequence correlation.

The intact viral RNA used by us as initiating template was isolated from purified virus. It was obtained by de-proteinizing the RNA with phenol and purifying the RNA on sucrose gradients. It was not obtained from the virus-infected bacteria but from the complete virus particle (MS-2 and $Q\beta$).

The replicases were obtained by introducing viral RNA into an isolated mutant Hfr strain of $E.$ $coli$ (Q-13). The molecular weight of $Q\beta$ replicase was about 130,000.

We reproduced the template in vitro, for example, by a factor of $10^{14}$. That is, for each molecule of intact template we synthesized $10^{14}$ replicas. Further, we made 5 micrograms (e.g., $3\times10^{12}$ strands) of synthesized viral RNA every 20 minutes per 0.25 ml. of reaction mixture.

We made tests with the replicases which established the following central features of the polymerase reaction: (i) the replicases cannot function properly with fragments of homologous RNA; the replicase, therefore, cannot replicate either foreign sequences or incomplete copies of their own genome; (ii) the replicase enzymes generate polynucleotides of the same molecular weight as the template viral RNA; (iii) reactions initiated with templates at concentrations below saturation of replicase enzymes exhibit autocatalytic synthesis of RNA; (iv) the purified enzyme replicase products can serve as templates with efficiencies equal to that of viral RNA; (v) the RNA produced by the enzyme replicases are biologically active, as demonstrated by infectivity tests; (vi) the RNA produced was fully as competent (as reflected by yield and degree of infectivity) as the original RNA in programming the synthesis of complete virus particles.

The data obtained showed that the self-propagation of complete viral genomes occurred in an aqueous system composed of buffer, purified replicase, intact RNA template, nucleotides, and magnesium ions. The present available evidence indicates that each of the several above-mentioned components must be represented in the reaction mixture to complete the replication cycle.

Biologically active RNA polymerase (replicase) and the infective RNA produced with our system and method are intact and free of the impurities or materials with which they are otherwise found in nature. The synthesized viral RNA, for example, is free of its normally occurring protein coating. The controlled RNA product produced with our system and method thus offers the advantage of being useful in experimental, laboratory and commercial activities where one wishes to use a biologically active RNA that is free of detectable confounding or extraneous materials. Our controlled system also is free of detectable confounding or extraneous materials and thus provides an important means for studying the mechanism by which genetic changes and replication occur in life's processes and a means of understanding, modifying, or changing such processes or mechanisms.

The isolation and purification of an RNA dependent RNA-polymerase (replicase) from $B.$ $coli$ infected with the RNA bacteriophage MS-2, provides a purified enzyme which shows a mandatory requirement for added RNA and, furthermore, exhibits a unique preference for its homologous RNA. Ribosomal and s-RNA of the host does not substtiute as a template and neither of these cellular RNA types shows any ability to interfere with the template function of the viral RNA.

The ability of the replicase to discriminate solves a crucial problem for an RNA virus attempting to direct its own duplication in an environment replete with other RNA molecules. By producing a polymerase which ignores the mass of pre-existent cellular RNA, a guarantee is provided that replication is focused on the single strand of incoming viral RNA, the ultimate origin of progeny.

Sequence recognition by the enzyme can be of value not only to the virus but also to the investigator. The search for viral RNA replicases must perforce be carried out in the midst of a variety of highly active cellular polymerases capable of synthesizing polyribonucleotides. If the enzyme finally isolated possesses the appropriate template requirement, a comforting assurance is furnished that the effort expended, and the information obtained, are indeed relevant to an understanding of viral replication. Operationally, this view demands that viral RNA be used at all fractionation stages in assaying for polymerase activity.

This led to the expectation that RNA replicases induced by other RNA viruses would show a similar preference for their homologous templates. An opportunity to test the validity of this prediction came with the isolation of a new and unrelated RNA bacteriophase (Qβ) in the laboratory of Professor I. Watanabe. (Nihon Rinsho, 22, 243 (1964)). A modification of the procedure employed to isolate the MS–2 replicase sufficed to yield a highly purified and active Qβ replicase.

The unambiguous analysis of a replicating mechanism demands evidence that the reaction being studied is, in fact, generating replicas. If, in particular, the concern is with the synthesis of a viral nucleic acid, data on base composition and nearest neighbors are not sufficient. Ultimately, proof must be offered that the polynucleotide product contains the information necessary for the production of the corresponding virus particle in a suitable test system.

These conditions impose severe restraints on the type of experiments acceptable as providing information which is irrefutably relevant to the nature of the replicating mechanism. The enzyme system employed must be free of interfering and confounding activities so that the reaction can be studied in a simple mixture containing only the required ions, substrates, and templates. Since the biological activity of the product is likely to be completely destroyed by even one break in the molecule, the elimination of nuclease activity must be very rigorous. The purity required imposes the necessity that the enzymological aspects of the investigation be virtually completed before an examination of mechanism can be safely instituted.

RNA replicases induced in *E. coli* by two serologically distinct RNA bacteriophages (MS–2 and Qβ) have been purified to a stage where they are free of detectable levels of RNAase, (ribonuclease), phosphorylase, and DNA-dependent RNA polymerase.

We have found that under optimal conditions, both enzymes (replicases) are virtually inactive with a variety of heterologous RNA species, including ribosomal and s-RNA of the host. Further, neither replicase can function with the other's RNA. The enzymes require homologous RNA and can mediate prolonged and extensive synthesis of polyribonucleotide (RNA). Each enzyme (replicase) recognizes the RNA genome of its origin and requires it as a template for normal synthetic activity.

In summary, the purified replicases exhibited the following distinctive features: (a) freedom from detectable levels of the DNA-dependent-RNA-polymerase, ribonuclease I (J. Biol. Chem., 236, 823–831 (1961)), ribonuclease II (J. Biol. Chem., 239, 3716–3726 (1964)), and RNA phosphorylase; (b) complete dependence on added RNA for synthetic activity; (c) competence for prolonged (more than 5 hours) synthesis of RNA; (d) ability to synthesize many times the input templates; (e) saturation at low levels of RNA (1√RNA/40√protein); (f) virtually exclusive requirement for intact homologous template under optimal ionic conditions.

The discriminating selectivity of the replicase permitted a simple test of similarity between template and product. When reactions are started at template concentrations below those required to saturate the enzyme, RNA synthesis follows an autocatalytic curve. When the saturation concentration level is reached, the kinetics become linear. The autocatalytic behavior below saturation of the enzyme implies that the newly synthesized product can in turn serve as templates for the reaction. To test this conclusion directly, the product was purified from a reaction allowed to proceed until a 65-fold increase of the input RNA had accumulated. The ability of the newly synthesized RNA to initiate the reaction was examined in a saturation experiment and found to be identical to RNA isolated from virus particles. It is evident that the sequences employed by the enzyme for recognition are being faithfully copied.

Attention was focused on the discriminating selectivity displayed by the two replicases in their response to added RNA. Neither replicase can function with the other's RNA. Each recognizes the RNA genome of its origin and requires it as a template for synthetic activity.

The specificity exhibited raises questions of the mechanism employed by the replicase to distinguish its template from other RNA molecules. An obvious device would invoke the recognition of a beginning sequence, a possibility open to the simple test of challenging the replicase with fragmented preparations of homologous RNA. If the initial sequence is the sole requirement, RNA fragmented into half and quarter pieces should serve adequately as templates.

Our experiments show fragmented viral RNA to be extremely inefficient to stimulating the replicase to synthetic activity, implying that the recognition mechanism involves more than the beginning sequence. It is apparently designed to avoid the replication of fragments of its own genome even if they contain the beginning sequence.

The RNA produced by replicase is fully competent to program the production of complete virus particles. The replicase purified from *E. coli* infected with an RNA bacteriophage (Qβ) generates a polynucleotide of the same molecular weight as viral RNA and the replicase cannot distinguish the viral RNA from its own RNA genome. By starting reactions at input ratios below the saturation levels of template to enzyme, autocatalytic kinetics of RNA increase are observed. It is apparent that the self-propagation of complete viral genomes or replicas of the input RNA is occurring in this simple system.

In conclusion, there has been established the following crucial features of the replicating reaction mixture of infectious viral RNA template, purified replicase, ribosidetriphosphates, and $Mg^{++}$: (1) the enzyme generates a polynucleotide of the same molecular weight ($1 \times 10^6$) as the viral RNA; (2) when reactions are initiated with template at concentrations below saturation of enzyme, autocatalytic synthesis of RNA is observed; (3) the purified product can, in turn, serve with full effectiveness as a template; (4) the RNA produced by the enzyme is biologically active, being as fully competent as the original RNA to program the synthesis of complete virus particles in protoplasts. These properties demonstrate unambiguously that the enzyme preparation being studied is, in fact, generating identical replicas of the input templates.

Figure 3:
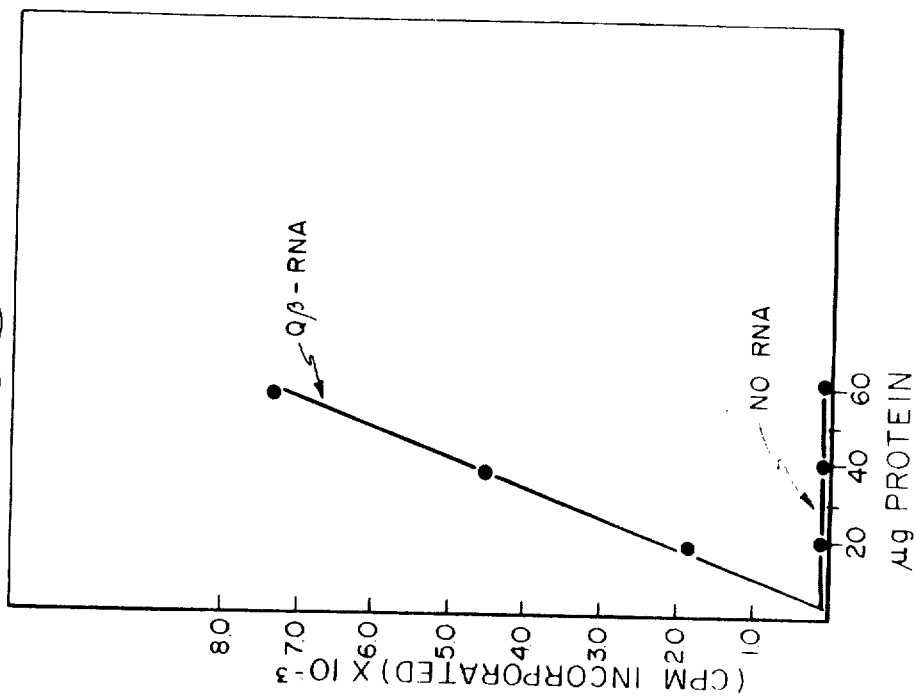
Figure 2:
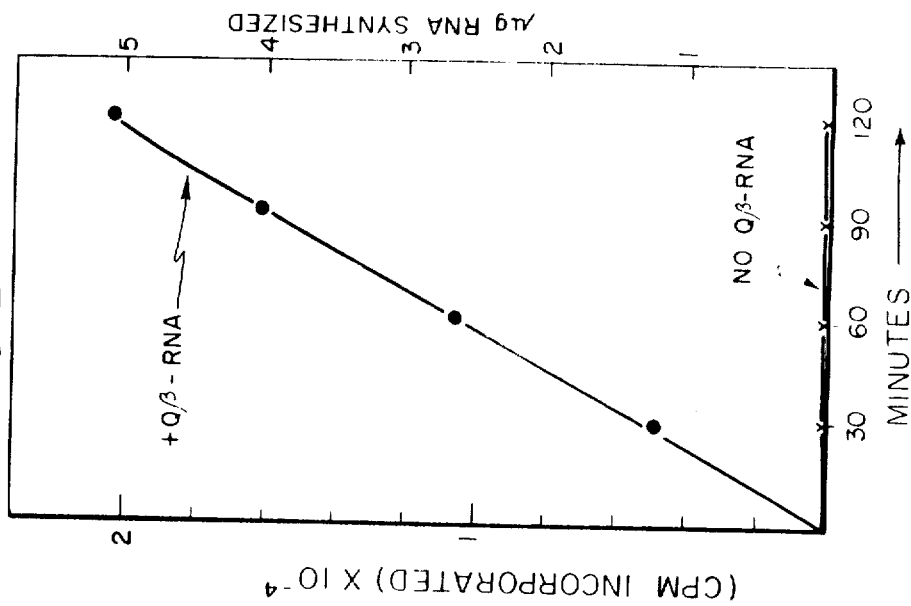

In the accompanying graphs or drawings:

FIG. 1 compares the elution profiles of protein and enzyme activity of preparations (see Example I, part 5) derived from infected and non-infected cells (Example I, part 7). The complete dependence on Qβ-RNA shows that the enzyme contains no nucleic acid which can serve to stimulate the enzyme to acivity within the period of assay. A corresponding fraction from uninfected cells shows similar elution properties but possesses no detectable RNA synthesizing ability;

FIG. 2 shows (Example I, part 7) the kinetics of replicase activity in a reaction mixture containing saturating amounts of RNA template (1 μg. of protein). By variation in the amount of RNA added and the time permitted for synthesis, virtually any desired fold-increase of the starting material has been achieved;

FIG. 3 shows (Example I, part 7) the effect of added amounts of protein at a fixed level of RNA template (5 μg. RNA/0.25 ml.). It is evident that the reaction responds linearly, which indicates the absence of interfering contaminants in the purified enzyme;

FIG. 4 shows the kinetics of RNA synthesis and compares the apeparance of both new RNA and infectious units at various periods of time (Example III, part 1).

Figure 5:
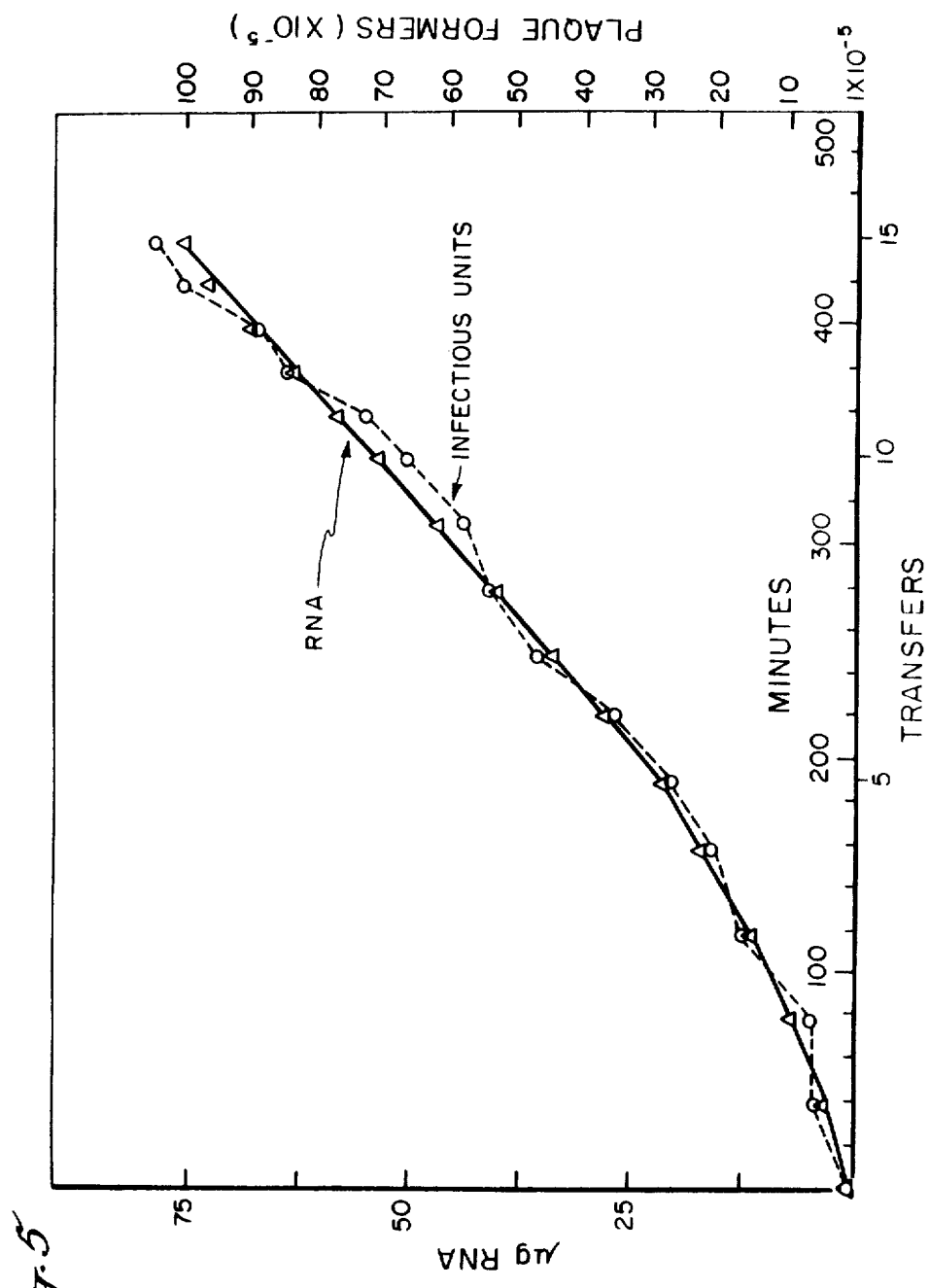
Figure 6:
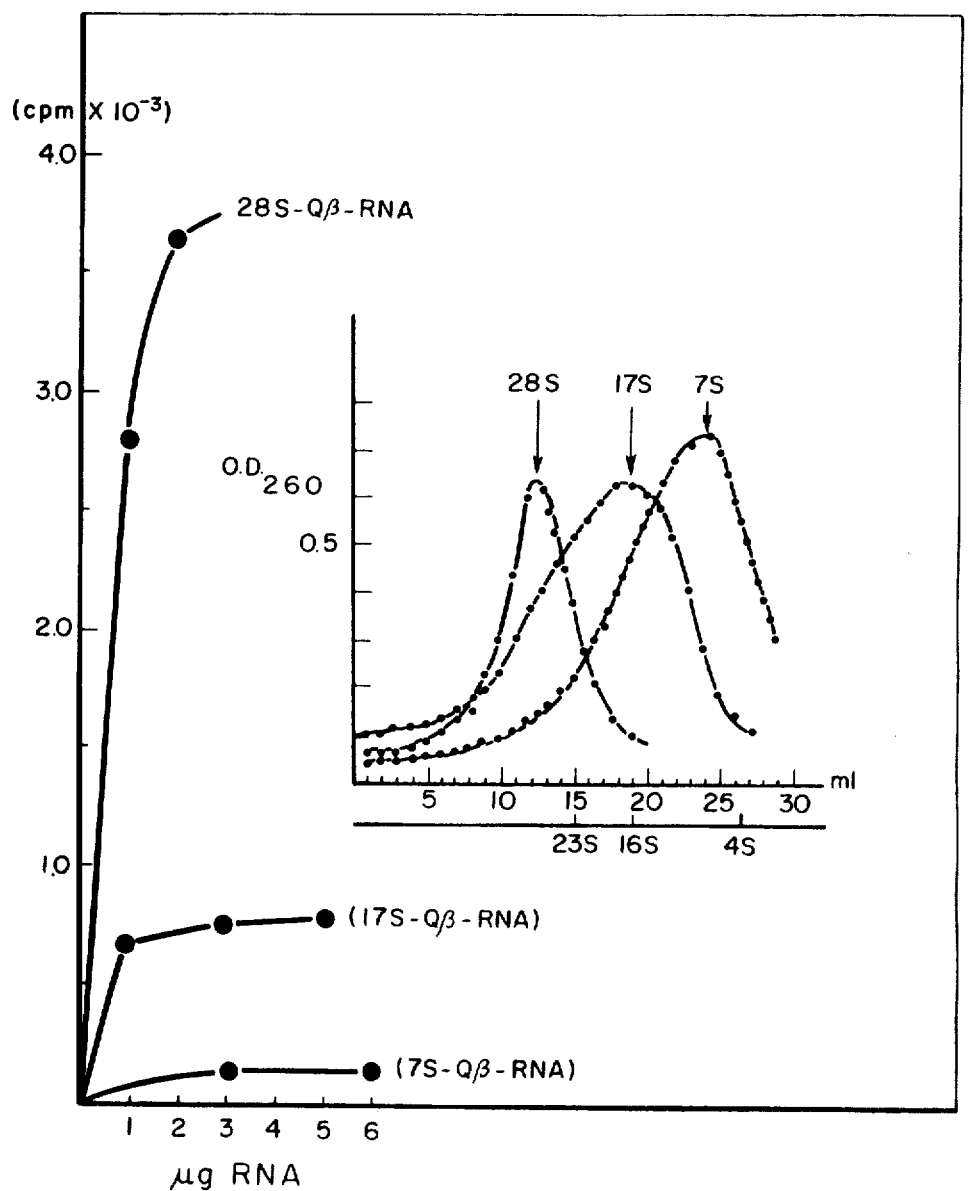

The increase in RNA produced is paralleled by a rise in the number of infectious units;

FIG. 5 compares newly synthesized RNA and infectious units at stages of a serial transfer experiment (Example III, part 2). The newly synthesized RNA is fully as competent as the original viral RNA to program the synthesis of viral particles and to serve as templates for the generation of more copies;

FIG. 6 shows the response of replicase to intact and fragmented Qβ-RNA (Example IV, part 2). The fragmented Qβ-RNA is unable to simulate the replicase to anywhere near its full activity; and FIG. 7 shows the effects of RNA template size and $Mn^{++}$ on the kinetics of RNA synthesis, and the abnormalities induced in the reaction by either fragmented RNA or the presence of $Mn^{++}$ (Example IV, part 2). The synthesis of RNA continues linearly for extensive periods in the presence of saturating amounts of intact template and $Mg^{++}$. When $Mn^{++}$ is included in the reaction mixture, the reaction stops in about 60 minutes even with the 28S-RNA as the template. The response of the enzyme to fragmented template is such that the initial reaction rate is less than 10% of normal and ceases completely in 30 minutes whether $Mn^{++}$ is present or not.

Referring to the specific examples which follow, Example I involves two RNA replicases induced in the same host by unrelated RNA bacteriophages. Both replicases have been purified and their responses to various RNA molecules examined. Under optimal ionic conditions both are virtually inactive with heterologous RNA, including ribosomal and s-RNA of the host. Neither replicase can function with the other's RNA. Each recognizes the RNA genome of its origin and requires it as a template for synthetic activity. This discriminating selectivity of its replicase is of obvious advantage to a virus attempting to direct its own duplication in a cellular environment replete with other RNA molecules.

Experiments are described in Examples II and III, infra, with a purified replicase induced in *E. coli* by the RNA bacteriophage Qβ. The data demonstrate that the enzyme can generate identical copies of added viral RNA. A serial dilution experiment established that the newly synthesized RNA is fully as competent as the original viral RNA to program the synthesis of viral particles and to serve as templates for the generation of more copies. Since the data show that the enzyme is, in fact, generating replicas, an unambiguous analysis of the RNA replicating mechanism is now possible in a simple system consisting of purified replicase, template RNA, ribosidetriphosphates, and $Mg^{++}$.

In Example IV, infra, fragmented viral RNA was found to be extremely inefficient in stimulating the replicase to synthetic activity. The replicase is apparently designed to avoid the replication of fragments of its own genome. Although the synthesis of viral RNA continues linearly for extensive periods in the presence of saturating amounts of intact template and $Mg^{++}$, if $Mn^{++}$ is included in the reaction mixture, the reaction stops after a relatively short period of time.

Example V, infra, illustrates a procedure for obtaining intact viral RNA such as Qβ phage for use as a template. The same general procedure may be used prepare MS-2 phage, as well as other phages.

EXAMPLE I (1) Bacteria and viruses

The bacterial viruses employed are MS-2 (originally obtained from Dr. A. J. Clark of the department of microbiology, University of California, Berkeley, Calif.) and Qβ (provided by Professor Watanabe). When working with both MS-2 and Qβ, it is essential to continually monitor for contamination of one by the other. Fortunately there is virtually no serological cross reaction between the two (Nihon Rinsho, 22, 243 (1964)), so that the appropriate antisern can be used for identification and purity checks.

The two RNA coliphages, MS-2 and Qβ, have been characterized physically and serologically. MS-2 has an $S_{20, w.}$ value of 79, a molecular weight of $3.6 \times 10^6$, a density of 1.422 and pH 3.9 as its isoelectric point. Qβ has an $S_{20, w.}$ of 84, a molecular weight of $4.2 \times 10^6$, a density of 1.439, and an isoelectric point at pH 5.3. One host (*E. coli* A-19) permits a distinction between the two on the basis of a marked difference in plaque size. They are distinct immunochemically, no serological cross reaction being detectable.

The host and assay organism is a mutant Hfr strain of *E. coli* (Q-13) isolated in the laboratory of W. Gilbert of the department of biology, Harvard University, Cambridge, Mass., by Diane Vargo, formerly an assistant of Dr. Glbert, now a graduate student in the department of microbiology, University of Illinois, Urbana, Ill. It has the convenient property of lacking ribonuclease I and RNA phosphorylase. (Fed. Proc., 24, 293 (1965): Q-13 is a derivative of A-19, a RNAase negative mutant reported here.) Preparation of virus stocks and purified RNA followed the methods of Doi and Spiegelman in Proc. Nat'l Acad. Sci., U.S., 49, 353-360 (1963).

(2) Preparation of infected cells

The basic medium employed for growing infected cells and producing virus contained the following in grams per liter: $NH_4Cl$, 1: $MgSO \cdot 7H_2O$, 0.06; gelatin $1 \times 10^{-5}$; casamino acids (vitamin free), 15; glycerol, 30; to this is added after separate autoclaving 7 ml. of 0.1 M $CaCl_2$ and 10 ml. containing 4 gms. of $Na_2HPO_4 \cdot 7H_2O$ and 0.9 gm. $KH_2PO_4$. Lysates in liter quantities are first prepared to be used for infection of larger volumes of cell suspensions. These are obtained by infecting log phase cultures ($OD_{660}$ of 0.25) with a purified phage preparation at a multiplicity of about 5. They are incubated while shaking at 37° C. until lysis is complete and then monitored for titer and purity of the phage. Such lysates can be stored frozen at −17° C. indefinitely and thawed just prior to use. In general, 35 liter quantities of cells are grown up in carboys to an $OD_{660}$ of between 0.275 and 0.290. The temperature in the carboys is 34° C. while the temperature of the water bath in which they are immersed is maintained at 37° C. When the cells reach an $OD_{660}$ of 0.275, they are infected with virus at a multiplicity of between 10 and 50 and allowed to aerate for mixing for one minute. The aeration is interrupted for 10 minutes for absorption, reinstituted, and the incubation continued. At 25 minutes sufficient sucrose and magnesium are added to give final concentrations of 18% and 0.01 M respectively. After another 5 minutes the process is terminated by the addition of crushed ice. The cells are harvested in a Sharples Centrifuge and stored at −14° C., at which temperature ability to yield active enzyme is retained for periods exceeding 6 months. Uninfected cells are prepared and stored in the same manner. To provide uniform preparations for enzyme isolation the cells are thawed sometime prior to use and resuspended (20 grams of packed cells in 100 ml.) in a solution containing 0.01 M tris buffer pH 7.4, 0.001 M $MgCl_2$, and 0.0005 M mercaptoethanol and 5 μg./ml. of DNAase (ribonuclease). After thorough resuspension with a magnetic stirrer at 4° C., the suspension is divided into convenient aliquots in plastic tubes, frozen, and stored at −14° C.

(3) Radioactive substrates $p^{32}$-labeled ribonucleoside monophosphates were synthesized as described in Proc. Nat'l Acad. Sci., U.S., 50, 905-911 (1963). The labeled mononucleotides were converted enzymatically to the corresponding ribonucleoside triphosphates by a kinase preparation isolated (Biochim. Biophys. Acta, 61, 29-33 (1962) from *E. coli*.

(4) Chemical and biological reagents

Unlabeled riboside triphosphates were from P–L Biochemicals, Inc., Milwaukee, Wis. DNAase was 2X recrystallized from Worthington Biochemical Company, Freehold, N.J., further purified on DEAE-cellulose columns to remove contaminating ribonuclease. Phosphoenolpyruvate (PEP) and the corresponding kinase (PEP-kinase) were purchased from Calbiochem, Inc., Los Angeles, Calif.; lysozyme from Armour and Company, Kankakee, Ill.; and protamine sulfate from Eli Lilly, Indianapolis, Ind. The turnip-yellow-mosaic-virus (TYMV-RNA) and the "satellite virus" of the tobacco-necrosis-virus (STNV-RNA) were both provided by Dr. E. Reichmann of the Botany Department at the University of Illinois.

(5) Preparation of enzyme

The following procedure is described for 20 grams of packed cells. The frozen cell suspension (120 ml.) is thawed and to this is added 0.5 mg./ml. of lysozyme following which the mixture is frozen and thawed twice, using methanol and Dry Inc as the freezing mixture. To the lysate are added 0.9 ml. of 1 M $MgCl_2$ and 2.5 µg./ml. DNAase (deoxyribonuclease) and the resulting mixture is incubated for 10 minutes in an ice bath. The extract is then centrifuged for 20 minutes at 30,000×g and the supernate removed. The pellet is transferred to a pre-chiled mortar, ground for 5 minutes, and then resusupended in 30 ml. of the same buffer as used for the cell suspension except that the magnesium concentration is raised to 0.01 M to increase the effectiveness of the DNAase digestion. The extract is then centrifuged at 30,000×g for 20 minutes and the two supernates combined, adjusted to 0.01 M EDTA, ethylene diamine tetraacetic acid, (previously brought to pH 7.4), and incubated at 0° C. for 5 minutes. Insoluble proteins appear and are removed by centrifugation at 30,000×g for 20 minutes. At this stage, a typical active infected extract has an $OD_{260}$ of between 150 and 180. Lower values commonly signal a poor infection with a resulting low yield of enzyme. To the cleared supernatant fluid is added 0.01 mg. of protamine sulfate for each $OD_{260}$ unit. After 10 minutes the precipitate, containing virtually all the enzyme activity, is collected by centrifugation at 12000×g for 10 minutes. It is dissolved in 12 ml. of "standard buffer" (0.01 M tris buffer, pH 7.4; 0.005 M $MgCl_2$; 0.0005 M mercaptoethanol), adjusted to 0.4 M $(NH_4)_2SO_4$, and allowed to stand overnight at 0° C. This period of waiting is important for the subsequent fractionation since complete disaggregation was found to be essential for acceptable separation of the replicase from transcriptase "transcriptase" is the transcribing enzyme which employs DNA as a template to synthesize complementary RNA and is also known as DNA-dependent RNA polymerase). The extract is diluted with 24 ml. of standard buffer, and after 20 minutes, is centrifuged at 30,000×g for 20 minutes and for each 40 ml. of supernatant are added 12 ml. of a 0.5% solution of protamine sulfate. The precipitate which forms contains virtually all of the DNA-dependent RNA polymerase along with an RNA independent RNA polymerizing activity. The RNA replicase remains in the supernatant and begins to show good dependence on added RNA. (This is one of the critical steps in the fractionation and any variation in host, medium, time or temperature of infection modifies the amount of protamine required to achieve separation. It is often safer to titrate small aliquots and determine the amount of protamine needed by appropriate assays.) After 10 minutes the precipitate is removed by centrifugation at 12,000×g for 10 minutes. To the resulting supernate is added an equal volume of saturated ammonium sulfate (saturated at 0° C. and adjusted to pH 7.0 with ammonium hydroxide). After 10 minutes at 0° C. the precipitate is collected by centrifugation at 12,000×g for 10 minutes and dissolved in 4 ml. of standard buffer containing 0.4 M ammonium sulfate. The resulting solution is then dialyzed against one liter of standard buffer for 1.5 hours. The dialyzed fraction is adjusted to 0.05 M ammonium sulfate with standard buffer and passed through a DEAE-cellulose column (1.2×10 cm.) which is washed with 100 ml. of standard buffer just prior to use. After loading the protein, the column is washed with 40 ml. of standard buffer containing 0.12 M NaCl which removes protamine, a poly-A synthetase (J. Biol. Chem., 237, 3786–3793 (1962) and residual K-dependent ribonuclease. The enzyme is then eluted with 35 ml. of standard buffer containing 0.20 M NaCl. To fractions possessing enzyme activity, saturated ammonium sulfate is added to make the final solution 10% saturation. At this stage, the enzyme preparation has an $OD_{280}/OD_{260}$ ratio of 1.35 and usually contains 1 mg. of protein per ml. Under the ionic conditions specified, no loss in activity is observed over a month of storage at 0° C.

(6) The standard assay—assay of enzyme activity by incorporation of radioactive nucleotides The standard reaction volume is 0.25 ml. and unless specified differently contains the following in µmoles: tris HCl pH 7.4, 21; magnesium chloride, 3.2 (when included, manganese chloride, 0.2); CTP, ATP, UTP, and GTP, 0.2 each. The enzyme is usually assayed at a level of 40 µg. of protein in the presence of 1µg. of RNA template. The reaction is run for 20 minutes at 35° C. and terminated in an ice bath by the addition of 0.15 ml. of neutralized saturated pyrophosphate, 0.15 ml. of neutralized saturated orthophosphate, and 0.1 ml. of 80% trichloracetic acid. The precipitate is transferred to a membrane filter and washed seven times with 5 ml. of cold 10% TCA. The membrane is then dried and counted in a liquid scintillation counter as described in Proc. Nat'l. Acad. Sci., U.S., 50, 905–911 (1963). This washing procedure brings zero time counts to less than 80 c.p.m. with input counts of $1 \times 10^6$ c.p.m. The specific activities of the labeled triphosphates added were adjusted so that with the efficiency employed, $1 \times 10^6$ c.p.m. corresponds to 0.2 µmoles of the corresponding triphosphate.

(7) Results (A) Properties of the purified Qβ replicase.—FIG. 1 concerns chromotography on DEAE-cellulose of second protamine supernatant and compares the elution profiles of protein and enzyme activity of preparations (see part 5, supra) derived from infected and non-infected cells.

In obtaining the data for FIG. 1, the following procedure was used: 35 ml. of 0.2 M NaCl in standard buffer was placed on the column just before collection of fraction number 1. Prior to this, the column had been washed with 0.12 M NaCl as described in part 5, supra. It will be noted that the peak of enzyme activity is found in the descending shoulder of the O.D. profile. Rechromatography yields coincidence of the two.

Infected preparations exhibit a polymerase activity which elutes with 0.2 M NaCl, responds excellently to added Qβ-RNA, and is devoid of the DNA-dependent RNA polymerase. The complete dependence on Qβ-RNA shows that the enzyme contains no nucleic acid which can serve to stimulate the enzyme to activity within the period of assay. A corresponding fraction from uninfected cells shows similar elution properties but possesses no detectable RNA synthesizing ability.

Table 1, infra, shows that after the DEAE step the enzyme is completely devoid of ribonuclease I, phosphorylase, and the K+-stimulated ribonuclease. The presence of the energy-generating system (PEP+PEP kinase) has little effect on the reaction (see Table 2, infra) indicating freedom from interfering enzymes which can destroy riboside triphosphates. Finally, DNAase has no influence on the reaction, whereas the presence of even small amounts of pancreatic ribonuclease completely eliminates the net snythesis of polyribonucleotide.

The enzyme system requires not ony template, but, in addition, all four riboside triphosphates (see Table 3, infra). The replicase has an absolute requirement for divalent ions, magnesium being the preferred ion and homologous RNA, Manganese substitutes partially (10%) and induces interesting changes in the nature of the reaction, the details of which will be described in Example IV, infra.

TABLE 1.—ASSAY FOR RIBONUCLEASE AND PHOSPHORYLASE [1]

| | $C^{14}$-ADP incorporation (30 min.) cpm. | Percent $H^3$-RNA hydrolyzed in 30 minutes | | |
|---|---|---|---|---|
| | | 0.25 M K+ | 0.25 M Na+ | Neither |
| Before DEAE | [1] 40 | 41 | 12 | 2 |
| After DEAE | [2] 32 | <2 | <2 | <2 |

[1] The assay for phosphorylase was carried out as described at J. Mol. Biol., 11, 257-271 (1965). Each reaction (0.25 ml.) contained 40 µg. protein and 1 µ mole of $C^{14}$-ADP at 6×10⁴ c.p.m. For the ribonuclease, 10 µg. at 1×10⁴ c.p.m. were added per reaction mixture.
[2] Similar preparations from wild type incorporate 30,000 c.p.m. (equivalent to 480 µ moles) before DEAE step and about half that after elution from the column.

TABLE 2.—EFFECT OF NUCLEASES AND ENERGY GENERATING SYSTEM ON Oβ REPLICASE [1]

| Addition | Template | Cpm. Incorporated |
|---|---|---|
| PEP (1.0 µmole) plus PEP kinase (10µg.) | Qβ<br>— | 4.803<br>96 |
| DNAase (5µg.) | Qβ<br>— | 3.938<br>45 |
| RNA (1µg.) | Qβ<br>— | 19<br>37 |
| None | Qβ<br>— | 4.142<br>75 |

[1] Except for the additions noted, the assays were carried out under the standard conditions described in part 6, supra.

Table 3.—Requirements of Qβ Replicase*

Assay mixture: UMP (or AMP) incorporation µµmoles
- Complete — 390
- Qβ-RNA — 7
- -GTP — 5
- -Mg, -Mn — 8

*Conditions of assay are those described in part 6, supra, except that Mn⁺⁺ was included at 0.2 µmoles per 0.24 ml.

FIG. 2 concerns the kinetics of replicase activity and shows the kinetics observed in a reaction mixture containing saturating amounts of template (1 µg. RNA per 40 µg. of protein). In obtaining the data for FIG. 2: each 0.25 ml. contained 40 µg. of protein and 1µg. of Qβ-RNA; all other conditions are as specified in part 6; the specific activity of the UTP³² was such that the incorporation of 4,000 c.p.m. corresponds to the synthesis of 1 µg. of RNA. Continued synthesis is observed at 35° C. for periods exceeding 5 hours. It will be noted that in 2 hours the amount of RNA synthesized corresponds to 5 times the input template. By variation in the amount of RNA added and the time permitted for synthesis, virtually any desired fold-increase of the starting material has been achieved. The cessation of synthesis within 5-10 minutes reported by others for presumably similar preparations has been observed by us only in the early stages of purification. FIG. 3 concerns the response to added protein and examines the effect of added amounts of protein at a fixed level of template (5 µg. RNA/0.25 ml.). In obtaining data for FIG. 3, assays were run for 20 minutes at 35° C. under conditions specified in part 6, and, again, the incorporation of 4,000 c.p.m. corresponds to the synthesis of 1 µg. of RNA. It is evident that the reaction responds linearly indicating the absence of interfering contaminants in the purified enzyme.

(B) Specific template requirements of the replicases.—Table 4, infra, records the abilities of various RNA molecules to stimulate the Qβ replicase to synthetic activity at the saturation concentration (1 µg.) of homologous RNA and twice this level. The response of the Qβ replicase is for the MS-2 replicase, the preference being clearly for its own template. The only heterologous RNA showing detectable activity is TYMV and, at the 2 µg. level, it supports a synthesis corresponding to 6% of that observed with the homologous Qβ-RNA. Both of the heterologous viral RNA's, MS-2, and STNV are completely inactive and, again, so are the ribosomal and transfer RNA species of the host cell (E. coli Q-13). As might be expected, bulk RNA from infected cells shows some templating activity which increases as the infection is allowed to progress. There is no detectable DNA-dependent RNA polymerase activity.

TABLE 4.—RESPONSE OF Qβ REPLICASE TO DIFFERENT TEMPLATES [1]

| Template | Input levels of RNA | |
|---|---|---|
| | 1 µg. | 2 µg. |
| Qβ | 4,929 | 4,945 |
| TYMV | 146 | 312 |
| MS-2 | 35 | 26 |
| Ribosomal RNA | 45 | 9 |
| s-RNA | 15 | 57 |
| Bulk RNA from infected cells | 146 | 263 |
| Satellite virus | 61 | 51 |
| DNA (10 µg.) | 36 | — |

[1] Conditions of assay are those specified in part 6, supra. However, as in all cases, assay for DNA dependent activity is carried out at 10 µg. of DNA per 0.25 ml. of reaction mixture. Control reactions containing no template yielded an average of 30 c.p.m.

To permit a definitive comparison of the two replicases derived from the same host, the MS-2 enzyme was isolated from appropriately infected Q-13. The purification of the MS-2 replicase followed precisely the same protocol as described for the Qβ enzyme (part 5, supra) except that 0.22 M NaCl is used for elution from the DEAE column.

The results of the comparison between the two replicases are shown in Table 5, infra, and they are satisfyingly clear-cut. The MS-2 replicase shows no evidence of accepting the Qβ-RNA as a template at either level of RNA input. Similarly, the Qβ replicase completely ignores the MS-2 RNA while functioning quite well on its own template. It would appear from these data that template specifically is completely confirmed.

TABLE 5.—TEMPLATE SPECIFICITY OF TWO RNA REPLICASES [1]

| Enzyme | RNA templates | | | |
|---|---|---|---|---|
| | MS-2 RNA | | Qβ-RNA | |
| | 1 µg. | 2 µg. | 1 µg. | 2 µg. |
| MS-2 | 4,744 | 4,366 | 0 | 56 |
| Qβ | 36 | 65 | 2,871 | 3,731 |

[1] Conditions of assay are those specified in part 6, supra, with Mn⁺⁺ present at p.2 µmoles per 0.25 ml.

With respect to the state of the enzyme and the method of purification, it is possible to isolate comparatively pure replicase from suitably infected wild type Hfr strains (Proc. Nat'l. Acad. Sci., U.S., 50, 905-911 (1963)). However, the use of the mutant Q-13 offered an obvious advantage for the purification of the replicase since the crude extract was already free of ribonuclease I and phosphorylase. The two remaining interfering activities were due to the DNA-dependent RNA polymerase (transcriptase) and a potassium stimulated ribonuclease.

It is important to emphasize that the complete removal of the transcriptase is essential if questions of mechanism and replicase specificity are to be answered without ambiguity. The transcriptase can employ any RNA as templates for RNA synthesis and, in the process, forms a ribonuclease resistant structure. Consequently, the use of DNAase or actinomycin D does not ensure against confusion with transcriptase activity. In the fractionation procedure described in Example I, part 5, most of the transcriptase is removed in the precipitate fraction of the second protamine step. The remainder is left behind as a late component in the DEAE column. The potassium dependent nuclease is tightly bound to cell membrane fragments which are discarded in the low speed fraction by our comparatively gentle freeze-thaw method of cell rupture. The small amount of ribonuclease that does contaminate the extract is removed from the DEAE column by washing with 0.12 M NaCl which at the same time eliminates protamine and a poly-A synthesizing enzyme (J. Biol. Chem., 237, 3786–3793 (1962)). The resulting freedom from interfering and confounding activities makes it possible to study the replicase in a simple mixture containing only the required ions, substrates, and template.

The distinctive properties of the purified replicases described above may be summarized as follows: (a) complete dependence on added RNA; (b) competence for prolonged (more than 5 hours) synthesis of RNA; (c) ability to synthesize many times the input template; (d) saturation at low levels of RNA (1 $\mu$g. RNA per 40 $\mu$g. protein); (e) virtually exclusive requirement for homologous template under optimal ionic conditions.

In view of the very different states of purity, it is difficult to interpret the differences in the properties observed with the enzymes reported here as compared with those detected or isolated by others. Activity independent of added RNA suggests that the purification has not achieved removal of contaminating RNA and, in any case, precludes examination of template specificity.

The comparison of the two purified replicases reported establish that each requires its homologous template. The experiment with the satellite-RNA (STNV) was a particularly interesting challenge. Reichmann showed (Proc. Nat'l. Acad. Sci., U.S., 52, 1009–1017 (1964)) that the satellite virus contains only enough RNA to code for its own coat protein which suggests that it must employ the replicase of the companion virus (TNV) for its multiplication. This implies either that the satellite is related in sequence to the TNV virus, or that it possesses a feature permitting it to employ any viral RNA replicase. The fact that STNV-RNA did not serve as a template for either one of the two purified replicases implies that the answer will be found in at least partial sequence homology between STNV and TNV genomes; this is open to experimental test.

The specificity relations exhibited raise the question of the mechanism used by the replicase to distinguish its template from other RNA molecules. The involvement of a beginning sequence is an obvious possibility. However, the recognition mechanism is even more subtle, being designed to avoid replication of fragments of its own genome even if they contain the beginning sequence.

It should be evident that the replicases have been brought to a state of purity permitting the performance of unambiguous experiments which can hope to illuminate the mechanism of the RNA replicative process.

EXAMPLE II (1) Biological system and enzyme preparation

The bacterial virus employed is Q$\beta$, isolated by Watanabe (Nihon Rinsho, 22, 243 (1964)). The host and assay organism is a mutant Hfr strain of *E. coli* (Q13) isolated in the laboratory of W. Gilbert by Diane Vargo. This bacterial strain has the convenient property (Fed. Proc., 24, 293 (1965)) of lacking ribonuclease I and RNA phosphorylase. The preparation of infected cells and the subsequent isolation and purification of the replicase follows the detailed protocol of Example I, supra. The preparation of virus stocks and the purification of RNA from them follow the methods in Proc. Nat'l. Acad. Sci., U.S. 49, 353–360 (1963).

(2) The assay of enzyme activity by incorporation of radioactive nucleotides

The standard reaction mixture is 0.25 ml. and in addition to 40$\gamma$ of enzyme, contains the following in $\mu$moles; Tris HCl, pH 7.4, 21; MgCl$_2$, 3.2; CTP, ATP, UTP, and GTP, 0.2 each. The reaction is terminated in an ice bath by the addition of 0.15 ml. of neutralized saturated pyrophosphate, 0.15 ml. of neutralized saturated orthophosphate, and 0.1 ml. of 80 pertrichoracetic acid. The precipitate is transferred to a membrane filter and washed 7 times with 5 ml. of cold 10% TCA. The membrane is then dried and counted in a liquid scintillation counter as described previously. UTP$^{32}$ was synthesized as described in Proc. Nat'l. Acad. Sci., U.S., 50, 905–911 (1963). It was used at a specific activity such that the incorporation of 20,000 c.p.m. corresponds to the synthesis of 1$\gamma$ of RNA, permitting the use of 20$\lambda$ samples for following the formation of labeled RNA.

(3) Isolation of synthesized product

Samples removed from the reaction mixture are placed immediately in an ice bath and 20$\lambda$ removed for immediate assay of radioactive RNA as described in part 2, supra. The volume is then adjusted to 1 ml. with TM buffer (10$^{-2}$ M tris, 5$\times$10$^{-3}$ M MgCl$_2$, pH 7.5). One ml. of water saturated phenol is then added and the mixture shaken in heavy wall glass centrifuge tubes (Sorvall, 18$\times$102 mm.) at 5° C. for one hour. After separation of the water phase from the phenol by centrifugation at 11,000 r.p.m. for 10 minutes, another 1 ml. of TM buffer is added to the phenol which is then mixed by shaking for 15 minutes at 5° C. Again, the phenol and water layers are separated, and the two water layers combined. Phenol is eliminated by two ether extractions, care being taken to remove the phenol from the walls of the centrifuge tubes by completely filling them with ether after each extraction. The ether dissolved in the water phase is then removed with a stream of nitrogen. The RNA is precipitated by adding 1/10 volume of potassium acetate (2 M) and 2 volumes of cold absolute ethanol. The samples are kept for 2 hours at $-20°$ C. before being centrifuged for one hour at 14,00 r.p.m. in a Sorvall SS 34 rotor. The pellets are drained and the remaining alcohol removed by storing under reduced pressure in a vacuum desiccator for 6–8 hours at 5° C. The RNA is then dissolved in 1 ml. of buffer (10$^{-2}$ M tris, 10$^{-2}$ M MgCl$_2$, pH 7.5) and samples removed immediately for infectivity assay. TCA precipitate radio-activity is measured on 20$\lambda$ aliquots of the final product from which the percent recovery of synthesized RNA can be determined. In the range of 1–8$\gamma$, it was found that in general, 65% of the synthesized RNA was recovered. All purified products were examined for the presence of intact virus particles by assay on whole cells and none were found.

(4) The assay for infectivity of the synthesized RNA

The procedure used is a modification of the spheroplast method of Guthrie and Sinsheimer as set forth in J. Mol. Biol., 2, 297 (1960). The necessary components are as follows:

(A) Medium.—The medium used is a modification of the 3XD medium of Fraser and Jerrel (J. Biol. Chem., 205, 291–295 (1953)) and requires in grams/liter the following: Na$_2$HPO$_4$, 2 g.; KH$_2$PO$_4$, 0.9 g.; NH$_4$Cl, 1 g.; glycerol (Fisher reagent), 30 g.; Difco Yeast Extract, 50 mg.; casamino acids (Difco Vitamin Free), 15 g.; L-methionine, 10 mg.; D,L-leucine, 10 mg.; MgSO$_4$·7H$_2$O, 0.3 g. These components are mixed in the order indicated in 500 ml. glass distilled water. To this is finally added another 500 ml. containing 0.3 ml. M CaCl$_2$.

(B) Sucrose nutrient broth (SNB).—The SNB contains in grams/liter the following: casamino acids (Difco), 10 g.; nutrient broth (Difco), 10 g.; glucose, 1 g.; sucrose, 100 g. After autoclaving, the following are added aseptically: 10 ml. of 10% MgSO$_4$ and 3.3 ml. of 30% bovine serum albumin (BSA) from Armour Laboratories.

(C) Reagents required for the production of spheroplasts.—The following solutions are required for the prouction of spherophlasts: lysozyme (sigma) at 2 mg./ml. in 0.25 M tris, pH 8.0; protamine sulfate from Eli Lilly and Co., 0.1%; and sterile solutions of 30% BSA; 0.25 M tris (Trizma), pH 8.0; 0.01 M tris, pH 7.5 and pH 8.0; 0.5 M sucrose; 0.4% EDTA in 0.01 M tri, pH 7.5.

For the preparation of spheroplasts, an overnight culture of Q13 in 3XD medium is first diluted into a fresh medium to an $OD_{660}$ of 0.06. The culture is allowed to grow to an $OD_{660}$ between 0.2 and 0.22 at 30° C., and the cells spun down at room temperature. The pellet from 25 ml. of cells is first suspended in 0.35 ml. of 0.5 M sucrose plus 0.1 ml. of 0.25 M tris, pH 8.0. Then 0.01 ml. of lysozyme is added followed by 0.03 ml. EDTA. After 10 minutes at room temperature, when conversion to spheroplasts is 99.9%, 0.2 ml. of this stock is diluted into 3.8 ml. SNB and 0.025 ml. of protamine sulfate is added. The spheroplast stock must be examined microscopically before proceeding. The presence of even 5% breakage of spheroplasts indicates a preparation which will give a low efficiency of plating. In agreement with Paranchych (Biochem. Biophys. Res. Commun., 11, 28 (1963)) we have found that protamine increases the efficiency of detection of infectious RNA. However, the optimal protamine concentration in the present system is considerably lower than that used by Paranchych.

The RNA infection is usually carried out at room temperature with solutions containing $0.5\gamma$ of RNA/ml., a concentration at which the assay is not limited by the number of spheroplasts per infectious unit. To 0.2 ml. of RNA is added 0.2 ml. of the spheroplast stock containing about $3 \times 10^7$ spheroplasts. The samples are mixed and immediately an aliquot is removed and diluted appropriately through SNB before plating on L-agar using Q13 as the indicator. The soft agar (0.7%) layer employed (2.5 ml.) contains 10% sucrose; 0.1% $MgSO_4$; and 0.01 ml. of 30% BSA per tube plus 0.2 ml. of an overnight culture of Q13. To obtain reproducibility, the spheroplast stock is used between 15 and 45 minutes after dilution into the SNB. Efficiency of plating (e.o.p.) is usually between $2-8 \times 10^{-7}$. Higher efficiencies ($>1 \times 10^{-6}$) can be obtained if the spheroplast stock is employed immediately after dilution and by including a stabilization period in the SBN dilution tubes, rather than plating immediately. However, this higher plating efficiency decays rapidly, making it difficult to obtain reproducible duplicates in repetitive assays. Since reproducibility was of greater concern than efficiency, the assay method detailed above was employed.

(5) Results

In designing experiments which involve infectivity assays of the enzymatically synthesized RNA, it is important to recognize that even highly purified enzymes from infected cells, although demonstrably devoid of intact cells, are likely to include some virus particles. Chemically, the contamination is trivial, amounting to $0.16\gamma$ of nucleic acid and $0.8\gamma$ of protein for each $1,000\gamma$ of enzyme protein employed in the present studies. Since $40\gamma$ of protein are used for each 0.25 ml. of reaction, the contribution to the total RNA by the particles is only $0.006\gamma$, which is to be compared with the $0.2\gamma$ of input RNA and the $3-20\gamma$ synthesized in the usual experiment. It was shown in control experiments that RNA freshly extracted from particles in the reaction mixture is no more infective than that obtained from the usual purified virus preparation. Further, the mandatory requirement for added RNA proves that within the incubation times used, this small amount of RNA is either inadequate or unavailable for the initiation of the reaction. Thus, these particles do not significantly influence either the chemical or the enzymatic aspects of the experiment. However, because of their higher infective efficiency, even moderate amounts of intact virus cannot be tolerated in the examinations of the synthesized RNA for infectivity. Consequently, all RNA preparations were phenol treated (see procedure in Example II, part 3) prior to assay. Further, the phenol purified RNA was routinely tested for whole virus particles and none were found in the experiments included herein.

EXAMPLE III

Experiments were made in which the kinetics of the appearance of new RNA and infective units were examined in two different ways. The first shows that the accumulation of radioactive RNA is accompanied by a proportionate increase in infective units. The second type proves by a serial dilution experiment that the newly synthesized RNA is infective.

(1) Assay of infectivity of the purified product

To compare the appearance of new RNA and infectious units in an extensive synthesis, 8 ml. of reaction mixture was set up containing the necessary components in the concentrations specified in Example II, part 2. Aliquots were taken at the times indicated for the determination of radioactive RNA and purification of the product for infectivity assay. The results concerning the kinetics of RNA synthesis and formation of infectious units are summarized in FIG. 4 in the form of a semilogarithmic plot against time of the observed increase in both RNA and infectious units.

In obtaining data for FIG. 4, an 8 ml. reaction mixture was set up containing the components at the concentrations specified in Example II, part 2. Samples were taken as follows: 1 ml. at 0 time and 30 min., 0.5 ml. at 60 min., 0.3 ml. at 90 min., and 0.2 ml. at all subsequent times. $20\lambda$ were removed for assay of incorporated radioactivity as described in Example II, part 2. The RNA was purified from the remainder (Example II, part 3), radioactivity being determined on the final product to monitor recovery. Infectivity assays were carried out as in Example II, part 4.

The amount of RNA ($0.8\ \gamma/ml.$) put in at zero time is well below the saturation level of the enzyme present. Consequently, the RNA increases autocatalytically for about the first 90 minutes, followed by a synthesis which is linear with time, a feature which we had observed previously. It will be noted that the increase in RNA is paralleled by a rise in the number of infectious units. During the 240 minutes of incubation, the RNA experiences a 75-fold increase and the infectious units a 35-fold increase over the amount present at zero time. These numbers are in agreement within the accuracy limits of the infectivity test. Experiments carried out with another enzyme preparation yielded results in complete accord with those just described.

It is clear that one can provide evidence for an increase in the number of infectious units which parallels the appearance of newly synthesized RNA.

(2) Proof that the newly synthesized RNA molecules are infective

The kind of experiments just described offer plausible evidence for infectivity of the radioactive RNA. They are not, however, conclusive, since they do not eliminate the possibility that the agreement observed is fortuitous. One could argue that the enzyme is "activating" the infectivity of the input RNA while synthesizing new noninfectious RNA and that the rather complex mixture of exponential and linear kinetics of the two processes happen to coincide by chance.

Direct proof that the newly synthesized RNA is infectious can in principle be obtained by experiments which use $N^{15}$-$H^3$-labeled initial templates to generate $N^{14}$-$P^{32}$-labeled product. The two can then be separated (Proc. Nat'l Acad. Sci., U.S. 49, 353–360 (1963)) in equilibrium density gradients of $Cs_2SO_4$. Such experiments have been carried out for other purposes. However, the stoopness of the $Cs_2SO_4$ density gradients makes it difficult to achieve a separation clean enough to be completely satisfying.

There exists, however, another approach which bypasses these technical difficulties and takes advantage of the fact that we are dealing with a self-propagating entity. Consider a series of tubes, each containing 0.25 ml. of the standard reaction mixture, but no added template. The first tube is seeded with 0.2γ of Qβ-RNA and incubated for a period adequate for the synthesis of several γ of radioactive RNA. An aliquot (50λ) is then transferred to the second tube which is in turn permitted to synthesize about the same amount of RNA, a portion of which is again transferred to a third tube, and so on. If each successive synthesis produces RNA which can serve to initiate the next one, the experiment can be continued until a point is reached at which the initial RNA of tube 1 has been diluted to an insignificant level. In fact, enough transfers can be made to insure that the last tube contains less than one strand of the input primer. If in all the tubes, including the last, the number of infectious units corresponds to the amount of radioactive RNA found, convincing evidence is offered that the newly synthesized RNA is infectious.

Table 6, infra, records a complete account of such a serial transfer experiment and the corresponding legend provides the details necessary to follow the assays and calculations. Sixteen tubes are involved, the first (tube 0) being an unincubated zero time control. It will be noted that the successive dilution was such (1 to 6) that by the 8th tube, there was less than one infectious unit ascribable to the initiating 0.2γ of RNA. Nevertheless, this same tube showed $8.8 \times 10^5$ newly synthesized infectious units during the 30 minutes of its incubation. Finally, tube 15, which contained less than one strand of the original input, produced $1.4 \times 10^{12}$ new strands and $3.2 \times 10^5$ infectious units in 20 minutes. It should be noted that a control tube lacking added RNA was incubated for 60 minutes. As compared with tube 1 which incorporated 4,800 c.p.m. for each 20λ in 40 minutes, the control showed no increase above the zero time level of 80 c.p.m. Further, no increase in infective units was observed in such controls.

TABLE 6.—SERIAL TRANSFER EXPERIMENT

| 1 Transfer No. | 2 Interval (min.) | 3 Time | Formation of RNA ||| | Concentration of original Template ||| | Formation of IU || | 13 Observed e.o.p. ×10⁻⁷ | 14 Percent recovery of P''-RNA |
|---|---|---|---|---|---|---|---|---|---|---|---|---|---|
| | | | 4 c.p.m.×10⁻³ | 5 Total (γ) | 6 Δ (γ) | 7 Σ (γ) | 8γ | 9 Strands | 10 IU | 11 ΔX 10⁻⁶ | 12 ΣX10⁻⁶ | | |
| 0 | 0 | 0 | 0 | 0.2 | 0 | 0 | 2.0×10⁻¹ | 1.2×10¹¹ | 6.0×10⁴ | 1.0 | 1.0 | 5.5 | |
| 1 | 40 | 40 | 64 | 3.2 | 3.0 | 3.0 | 2.0×10⁻¹ | 1.2×10¹¹ | 6.0×10⁴ | 5.2 | 5.2 | 3.2 | 54.2 |
| 2 | 40 | 80 | 84 | 4.2 | 3.6 | 6.6 | 4.0×10⁻² | 2.4×10¹⁰ | 1.2×10⁴ | 2.2 | 6.5 | 2.0 | 88.3 |
| 3 | 40 | 120 | 112 | 5.7 | 4.9 | 11.5 | 6.7×10⁻³ | 4.0×10⁹ | 2.0×10³ | 11.3 | 17.4 | 5.3 | 59.9 |
| 4 | 40 | 160 | 134 | 6.7 | 5.6 | 17.1 | 1.1×10⁻³ | 6.6×10⁸ | 6.6×10² | 5.7 | 21.2 | 3.0 | 42.3 |
| 5 | 30 | 190 | 113 | 5.7 | 4.4 | 21.5 | 1.9×10⁻⁴ | 1.1×10⁸ | 55 | 7.4 | 27.6 | 3.0 | 63.4 |
| 6 | 30 | 220 | 144 | 7.2 | 6.1 | 27.6 | 3.1×10⁻⁵ | 1.8×10⁷ | 9 | 15.0 | 36.4 | 3.7 | 82.4 |
| 7 | 30 | 250 | 150 | 7.5 | 6.1 | 33.7 | 5.1×10⁻⁶ | 3.0×10⁶ | 1.5 | 13.4 | 48.1 | 5.0 | 52.9 |
| 8 | 30 | 280 | 162 | 8.1 | 6.6 | 40.3 | 8.6×10⁻⁷ | 5.0×10⁵ | <1 | 8.8 | 54.7 | 5.2 | 51.4 |
| 9 | 30 | 310 | 164 | 8.2 | 6.6 | 46.9 | 1.4×10⁻⁷ | 8.4×10⁴ | <1 | 5.6 | 58.4 | 2.0 | 92.6 |
| 10 | 30 | 340 | 156 | 7.8 | 6.2 | 53.1 | 2.4×10⁻⁸ | 1.4×10⁴ | <1 | 9.3 | 66.8 | 4.0 | 54.2 |
| 11 | 20 | 360 | 134 | 6.7 | 5.1 | 58.2 | 4.0×10⁻⁹ | 2.3×10³ | <1 | 6.3 | 73.7 | 3.7 | 74.3 |
| 12 | 20 | 380 | 121 | 6.0 | 4.7 | 62.9 | 6.6×10⁻¹⁰ | 3.8×10² | <1 | 6.9 | 84.3 | 7.0 | 46.8 |
| 13 | 20 | 400 | 123 | 6.1 | 4.4 | 67.8 | 1.1×10⁻¹⁰ | 6 | <1 | 3.6 | 89.4 | 4.0 | 49.2 |
| 14 | 20 | 420 | 118 | 5.9 | 4.7 | 72.5 | 1.8×10⁻¹¹ | 1 | <1 | 10.8 | 102.0 | 5.7 | 79.7 |
| 15 | 20 | 440 | 75 | 3.6 | 2.4 | 74.9 | 3.1×10⁻¹² | 0.16 | <1 | 3.2 | 105.0 | 5.5 | 65.4 |

Sixteen reaction mixtures of 0.25 ml. were set up, each containing 40γ of protein and the other components specified for the "standard" assay in Example II, supra. 0.2γ of template RNA were added to tubes 0 and 1; RNA was extracted from the former immediately, and the latter was allowed to incubate for 40 min. Then 51γ of tube 1 were transferred to tube 2, which was incubated for 40 min. and 50γ of tube 2 then transferred to tube 3, and so on, each step after the first involving a 1-6 dilution of the input material. Every tube was transferred from an ice bath to the 35° C. water bath a few minutes before use to permit temperature equilibration. After the transfer from a given tube, 20γ were removed to determine the amount of pγ RNA synthesized, and the product was purified from the remainder as described in Example II, supra. Control tubes incubated for 60 min. without the addition of the 0.2γ of RNA showed no detectable RNA synthesis, nor any formation of infectious units.

All recorded numbers are normalized to 0.25 ml. Columns 1, 2, and 3 give the transfer number, the time interval permitted for synthesis, and the elapsed time from zero, respectively. Column 4 records the amount of radioactive RNA found in each tube at the end of the incubation, column 5 the total RNA in each, and 6 gives the net synthesis during the time interval. Column 7 lists the cumulative synthesis of RNA. The decreasing concentrations of the input RNA resulting from the serial dilutions are recorded in terms of γ (col. 8), number of strands (col. 9), and infectious units (IU) per tube (col. 10). The last is calculated from column 9 and from an efficiency of plating (e.o.p.) of 5×10⁻⁷. Column 11 lists the increment in infectious units observed during each period of synthesis, corrected for the efficiency of recovery (col. 14), and column 12 represents the corresponding sum. Column 13 is the plating efficiency (e.o.p.) determined from the observed number of plaques (col. 11) and the actual amount of RNA assayed as determined from columns 6 and 14. Column 14 is determined from assays of acid-precipitable radioactivity of 20γ aliquots of the final product as compared with column 5.

FIG. 5 concerns RNA synthesis and formation of infectious units in a serial transfer experiment, and compares the cumulative increments with time in newly synthesized RNA (column 7 of Table 6, supra) and infectious units (column 12 of Table 6, supra). All details of FIG. 5 are as described in Table 6, supra, and the data are taken from columns 7 and 11 of Table 6 and plotted against elapsed time (column 3) and corresponding transfer number (column 1). Both ordinates of FIG. 5 refer to amounts found in 0.25 ml. aliquots.

The agreement between increments in synthesized RNA and newly appearing infectious units is excellent at every stage of the serial transfer—and continues to the last tube. Long after the initial RNA has been diluted to insignificant levels, the RNA from one tube serves to initiate synthesis in the next. Further, as may be seen from the comparative constancy of the infective efficiency (FIG. 5 and column 13 of Table 6, supra), the new RNA is fully as competent as the original viral RNA to program the synthesis of viral particles in spheroplasts.

To complete the proof, it was necessary to show that the viruses produced by the synthesized RNA was indeed Qβ, the original source of the RNA used as a seed in tube 1 to initiate the transfer experiment. Since Qβ is a unique serological type (Nihon Rinsho, 22, 243 (1964)), this characteristic was chosen as a convenient diagnostic test. Plaques induced by the RNA synthesized in tube 15 were used to produce lysates, and the resulting particles exposed to antisera against MS-72 and Qβ. The results, briefly summarized in Table 7, infra, show clearly that the synthetic NAR induces virus particles of the same serological type as authentic Qβ.

TABLE 7.—SEROLOGICAL BEHAVIOR OF VIRUS FORMED IN RESPONSE TO "SYNTHETIC" RNA [1]

| Virus | Anti-sera— | | | | | |
|---|---|---|---|---|---|---|
| | Anti-Qβ | | | Anti-MS-2 | | |
| | 0 time | 10 minutes | Percent Survivors | 0 time | 10 minutes | Percent Survivors |
| Authentic Qβ | $1.9 \times 10^8$ | $1.0 \times 10^5$ | .052 | $1.1 \times 10^8$ | $1.06 \times 10^8$ | 96 |
| Virus from synthetic RNA | $1.5 \times 10^8$ | $8.8 \times 10^4$ | .053 | $1.5 \times 00^8$ | $1.40 \times 10^8$ | 93 |

[1] In all cases, lysates were made from *E. coli* Q13, which was also the assay organism. Antisera were used at 1/100 dilution and the incubation temperature was 35° C. The numbers represent plaque formers per ml.

One perhaps might have imagined that an enzyme carrying out a complex copying process would show a high error frequency when functioning in the unfamiliar environment provided by the enzymologist. Had this been a quantitatively significant complication, biologically inactive strands should have accumulated as the synthesis progressed. That this is not the case is rather dramatically illustrated by the serial transfer experiment (Table 6 and FIG. 5). The RNA synthesized after the 15th transfer is as competent biologically as the initiating "natural" material derived from virus particles.

The successful synthesis of a biologically active nucleic acid with a purified enzyme is itself of obvious interest. However, the implication which is most pregnant with potential usefulness stems from the demonstration that the replicase is, in fact, generating identical copies of the viral RNA. For the first time, a system has been made available which permits the unambiguous analysis of the molecular basis underlying the replication of a self-propagating nucleic acid. Every step and component necessary to complete the replication must be represented in the reaction mixture described. If two enzymes are required (Fed. Proc., 23, 1285–1296 (1964)), both must be present and it should be possible to either establish their existence or to prove that one is sufficient. If an intermediate "replicating" stage intervenes between the template and the ultimate identical copy (Fed. Proc., 23, 1285–1296 (1964)) then a "replicative form" should be demonstrably present in the reaction mixture. If copying is direct, no such intermediate will be found.

EXAMPLE IV (1) Procedure

The host and assay organism is *H. coli* Q–13, an Hfr mutant lacking ribonuclease 1 and phosphorylase (Fed. Proc., 24, 293 (1965)). The virus is Qβ, isolated by Watanabe (Nihon Rinsho, 22, 243 (1964)). All the methods of preparing infected cells, purification of the replicase, synthesis of radioactive substrates, and assay for enzyme activity have been detailed above.

The RNA of the Qβ virus is apparently more accessible to enzymatic breakage than that of MS-2 and therefore, some care and speed has to be exercised in preparing RNA from this virus.

The procedures are as follows: *B. coli* (Q–13) cultures were grown to an $OD_{660}$ between 0.2 and 0.3 in the presence of MS-2 antiserum at a dilution of 1 to 10,000. Qβ phage is added at a multiplicity of infection of 10 and the culture is incubated for 30 min. at 37° C. without shaking. The cultures are then aerated by shaking, lysis occurring after about 2 hrs. Shaking is continued for an additional 4 hrs. and then the cultures are chilled. The lysate is centrifuged for 10 min. at $5,000 \times g$ and 311 grams of ammonium sulfate are added to each liter of chilled supernatant. After 3–4 hrs. at 5° C., the particles are collected by centrifugation at $13,000 \times g$ for 1 hr. They are then resuspended in TM buffer ($10^{-2}$ M tris, $5 \times 10^{-3}$ M $MgCl_2$, pH 7.5) and dialyzed twice for two hours against 2,000 ml. of TM buffer. The phage suspension is then centrifuged at $10,000 \times g$ for 10 min. and the supernatant fluid incubated with pronase (1 mg./ml.) for 1 hr. at 30° C. Sodium dodecyl sulfate is then added to 0.4% and the RNA isolated by phenol (see Example 11, part 3) at 4° C.

(2) Results (A) Response to fragmented Qβ RNA.—Fragmented RNA molecules are readily obtained from Qβ by prolonging the 4 hr. period of the ammonium sulfate precipitation to 10 hrs. and beyond. The resulting RNA shows evidence of an ordered breakdown revealed by the appearance of reproducible peaks having sedimentation values lower than the 28S of the intact viral RNA. These are fractionated for size on a sucrose gradient, collected, and concentrated by alcohol precipitation. FIG. 6 concerns the response of replicase to intact and fragmented Qβ–RNA. The sedimentation profiles of three preparations are shown in the inset of FIG. 6. The first is the intact viral RNA (28S) prepared as described in part 1. The second is a half-piece with a mean of about 17S, and the third possesses a sedimentation coefficient of 7S. The responses of the replicase to the three RNA preparations are shown in FIG. 6. It is obvious that the fragmented material is unable to stimulate the replicase to anywhere near its full activity.

More specifically, the inset of FIG. 6 represents distribution in a linear sucrose gradient (2.5–15%) of RNA prepared and fractionated as described in part 1, supra. Each preparation was run in a separate bucket for 12 hrs. at 25,000 r.p.m. and 4° C. in a SW–25 Spinco rotor with markers (ribosomal RNA) to permit S-value determinations. The template function of each size class of RNA was determined in the assay described in Example 1, supra. In addition to 40 μg. of protein, each standard reaction volume of 0.25 ml. contained the following in μ moles: tris HCl, pH 7.4, 21; $MgCl_2$, 3.2; $MnCl_2$, 0.2; CTP, ATP, UTP, and GTP, 0.2 each. The reaction is run for 20 min. at 35° C. and terminated in an ice bath followed by precipitation with TCA and washing on a membrane for liquid scintilation counting as described in Example 1, supra. $UTP^{32}$ synthesized as detailed by Haruna et al. (Proc. Nat'l. Acad. Sci., U.S., 50, 905 (1963)) was used at a level of $1 \times 10^6$ c.p.m./0.2 μmoles.

(B) The effect of manganese on the size and sequence requirements of the replicase.—In the course of examining template specificity and size requirements of the Qβ-replicase, a striking effect of manganese was uncovered. A typical set of results are summarized in Table 8, infra. In the presence of $Mg^{++}$, the ability of either the 17S fragment or TYMV–RNA to stimulate the enzyme is almost negligible, corresponding to 2 and 4% respectively of that observed with intact Qβ-RNA. On the other hand, if $Mn^{++}$ is substituted for $Mg^{++}$, a striking change is observed. Normal synthesis with 28S RNA is strongly inhibited whereas the abnormal activities observed with 17S and TYMV–RNA are stimulated. Indeed, if one were unaware of the optimal conditions for the functioning of this enzyme, one might be tempted to conclude from the results obtained with $Mn^{++}$ that the Qβ-replicase prefers TYMV–RNA as a template and is comparatively indifferent to the size of the RNA with which it functions.

TABLE 8

Effects of Mg and Mn on template specificity of replicase.[1]

| Template | Mg++ (mm.) | MnI I (mm.) | Incorporation, c.p.m. |
|---|---|---|---|
| Qβ-28S | | | 146 |
| Qβ-17S | | | 63 |
| TYMV | | | 0 |
| | | | 16 |
| Qβ-28S | 4 | | 4,655 |
| Qβ-17S | 4 | | 109 |
| TYMV | 4 | | 218 |
| | 4 | | 1 |
| Qβ-28S | | 0.12 | 474 |
| Qβ-17S | | 0.12 | 222 |
| TYMV | | 0.12 | 766 |
| | | 0.12 | 103 |
| Qβ-28S | 3 | 0.2 | 2,804 |
| Qβ-17S | 3 | 0.2 | 240 |
| TYMV | 3 | 0.2 | 1,037 |
| | 4 | 0.2 | 103 |

[1] Reactions (0.25 ml.) contained 1 µg. of the indicated RNA and 40 µg. of protein in addition to the other components detailed in the description of Fig. 6, supra, with the modifications noted in the body of the table. Incubations were carried out at 35° C. for 20 min.; washing and counting was the same as described in Fig. 6. TYMV refers to intact RNA isolated from Turnip Yellow Mosaic virus. Qβ-28S is the intact RNA of the Qβ bacteriophage and 17S is the fragment of half-size.

The abnormalities induced in the reaction by either fragmented RNA or the presence of manganese is even more obvious from the kinetics of the reaction (see FIG. 7).

Reactions were set up as detailed in FIG. 6, except that Mn++ was omitted or included as indicated. Samples of 0.25 ml. were taken and treated for counting as in FIG. 6. Template concentrations were in all cases 1 µg. of RNA for each 40 µg. of enzyme in 0.25 ml. It should be noted that the ordinate of the right half of FIG. 7 is 1/10th that of the left half of FIG. 7.

As had been observed previously, synthesis continues linearly for extensive periods in the presence of saturating amounts of intact template and Mg++. If, however, Mn++ is included in the reaction mixture, the reaction stops in about 60 min. even with the 28S-RNA as the template. If we now examine the response of the enzyme to fragmented template (FIG. 7), it is seen that the initial reaction rate is less than 10% of normal and, furthermore, ceases completely in 30 min. whether Mn++ is present or not.

EXAMPLE V

Intact viral RNA for use as a template may be prepared in accordance with the procedure set forth below.

The host is an Hfr strain of *E. coli* (Q-13). It is grown at 37° C. with vigorous aeration on 3XD medimum (J. Biol. Chem., 205, 291 (1953)) to an optical density at 660 mµ of 0.15, which corresponds to 5× $10^8$ cells per ml. To eliminate any possibilities of cross-contamination with, for example, MS-2, a $10^{-4}$ dilution of MS-2 antiserum is put in the culture. If MS-2 is being grown up, antiserum against Qβ is included in the culture. The culture is then infected at a multiplicity of infection of 5 or greater of virus particles to cells. Approximately five minutes quiescence is allowed for absorption and then aeration is instituted until lysis occurs in about 2 to 3 hours.

The lysate is then assayed to determine the number of virus particles per ml., which usually run between 3 and 8× $10^{11}$ plaque forming units per ml. At this point, the presence of other possible contaminating particles are also monitored by using other hosts, e.g., *E. coli* B. In addition, the phage particles are checked against Qβ antiserum to make certain that they are Qβ phage particles.

The lysate is then centrifuged at 9000 r.p.m. for 45–60 minutes. The supernate is then poured into 3–4 liter beakers and 311 gms. of ammonium sulphate are then added per liter of the supernate. This is then allowed to stand for 2½ to 3½ hours at 4° C. and then centrifuged at 9000 r.p.m. again for 45 to 60 minutes. The supernate is discarded. The pellets are resuspended in 20 to 30 ml. of .01 molar tris buffer at pH 7.5 and $10^{-3}$ M magnesium. This is then dialyzed against 200 ml. of the same buffer for at least 4 hours at 4° C. After the dialysis, the phage suspension is centrifuged at 15,000 r.p.m. for 20 to 30 minutes and the pellet discarded. The supernate is incubated in the presence of 1 mg. per ml. of pronase for 60 minutes at 35° C. It is then made 0.2% with respect to sodium dodecyl sulphate. The resulting suspension is then shaken with water-saturated phenol. The protein is retained in the interface between the phenol and the water and the RNA, freed of protein, remains in the aqueous phase. The RNA can then be precipitated with two volumes of alcohol in the cold and the intact viral RNA recovered by centrifugation and resuspended in a suitable buffer for subsequent use.

Attempts at analyzing replicating mechanisms, must recognize the implications of the fact that the enzymes involved are likely to be complicated molecules. High levels of complexity provide the flexibility which permits the occurrence of abnormal activities, a potentiality which can be accentuated by exposure to either strange environments or unusual components. Thus, in the absence of primer, the DNA-dependent DNA-polymerase eventually initiates the synthesis of an A–T copolymer (J. Biol. Chem., 235, 3242 (1960)). In the presence of Mn++, the same enzyme will incorporate riboside triphosphates (Merg. P., H. Fancher, and M. Chamberlin, in Informational Macromolecules, ed. H. J. Vogel, V. Bryson, and J. O. Lampen (New York: Academic Press, (1963)) into a mixed polymer. Analogously, the DNA-dependent-RNA-polymerase (transcriptase) synthesizes poly A if supplied only with ATP, a reaction which is inhibited if the other riboside triphosphates are added (Symposia held at VII Internat. Congress for Microbiology, pp. 81–103 (1958); Proc. Nat'l. Acad. Sci., U.S., 48, 81 (1962)). If presented with a single stranded DNA, the transcriptase synthesizes a DNA–RNA hybrid (J. Mol. Biol., 8, 297 (1964); J. Mol. Biol., 8, 289 (1964); Proc. Nat'l. Acad. Sci., U.S., 52, 796 (1964); Biophys. J., 5, 231 (1965)), and if the template is RNA, a duplex RNA results (Proc. Nat'l. Acad. Sci., U.S., 49, 88 (1963); Proc. Nat'l. Acad. Sci., 48, 880 (1962); J. Mol. Biol., 9, 193 (1964)). The fact that such artifacts can occur makes it difficult to draw incontestable conclusions from the appearance of a product in a reaction. Evidence, other than simple existence, must be provided before a component is accepted as an obligatory normal intermediate in the polymerization process.

The experiments reported indicate that the response of the replicase of fragmented Qβ–RNA and heterologous RNA is very different from what is observed with intact Qβ–RNA. For the present, it must be emphasized that the study of the normal functioning of the replicase requires intact homologous RNA and the avoidance of Mn++. The early cessation of the reaction with fragments (see FIG. 7) may explain the limited synthesis seen by others with partially purified enzyme preparations from which nucleases have not been completely eliminated.

The inability of the replicase to properly employ fragments of its own genome as templates argues against a recognition mechanism involving only a beginning sequence. The enzyme can apparently sense when it is confronted with an intact RNA molecule, implying that some element of secondary structure is involved. A plausible formal explanation can be proposed in terms of "functional circularity." Thus, a decision on the intactness of a linear heteropolymer can be readily made by examining both ends for the proper sequences. An examination of this sort would be physically aided by forming a circle using terminal sequences of overlapping complementarity. The enzyme could then recognize the resulting region of double strandedness. This particular mechanism is offered only as a theorized example (not intended to limit our invention) of how an enzyme could simultaneously distinguish both sequence and intactness. Whatever the details turn out to be, it appears that the RNA replicases are designed to avoid the futility of replicating either foreign sequences or incomplete copies of their own genome.

Various changes and modifications of the invention can be made and, to the extent that such variations incorporate the spirit of this invention, they are intended to be included within the scope of the appended claims.

We claim:

1. An in vitro synthesized and isolated viral RNA composition characterized by being free of proteinaceous coating, having recognition structure recognizable by its specific replicase and being capable of replication in vitro over a selective prolonged period of time from nucleotide base components adenosine triphosphate, guanosine triphosphate, cytidine triphosphate and uridine triphosphate in the presence of its specific replicase which is free of detectable nuclease and destructive enzymological activity and divalent magnesium ions as an activating cofactor.

2. The composition of claim 1 including at least one labeled nucleotide base component.

3. An in vitro synthesized and isolated viral RNA composition characterized by being free of proteinaceous coating, having recognition structure recognizable by its specific replicase and being capable of replication in vitro over a selective prolonged period of time from nucleotide base components adenosine triphosphate, guanosine triphosphate, cytidine triphosphate and uridine triphosphate in the presence of its specific replicase which is free of detectable nuclease and destructive enzymological activity and divalent magnesium ions as an activating cofactor; said synthesized and isolated viral RNA being synthesized from an in vitro system including a template of naturally occurring parent viral RNA freed of its proteinaceous coating and having recognition structure recognizable by its specific replicase, nucleotide base components adenosine triphosphate, guanosine triphosphate, cytidine triphosphate and uridine triphosphate, said specific replicase of said template which is free of detectable nuclease and destructive enzymological activity, and divalent magnesium ions as an activating cofactor.

4. The composition of claim 3 including at least one labeled nucleotide base component.

5. An in vitro synthesized and isolated viral RNA composition characterized by being free of proteinaceous coating, having recognition structure recognizable by its specific replicase and being capable of replication in vitro over a selective prolonged period of time from nucleotide base components adenosine triphosphate, guanosine tirphosphate, cytidine triphosphate and uridine triphosphate in the presence of its specific replicase which is free of detectable nuclease and destructive enzymological activity and divalent magnesium ions as an activating cofactor; said synthesized and isolated viral RNA being synthesized from an in vitro system including a template of parent viral RNA free of proteinaceous coating and having recognition structure recognizable by its specific replicase, nucleotide base components adenosine triphosphate, guanosine triphosphate, cytidine triphosphate and uridine triphosphate, said specific replicase of said template which is free of detectable nuclease and destructive enzymological activity, and divalent magnesium ions as an activating cofactor.

6. The composition of claim 5 including at least one labeled nucleotide base component.

References Cited

Haruna et al., "Biochemistry," vol. 50, 1963, pp. 906–911.

LEWIS GOTTS, Primary Examiner

J. R. BROWN, Assistant Examiner

U.S. Cl. X.R.

195—28 N; 424—180

PO-1050
(5/69)

UNITED STATES PATENT OFFICE
CERTIFICATE OF CORRECTION

Patent No. 3,661,893      Dated May 9, 1972

Inventor(s) Solomon Spiegelman and Ichiro Haruna

It is certified that error appears in the above-identified patent and that said Letters Patent are hereby corrected as shown below:

Col. 2, line 2 "aldenine" should be --Adenine--;
       line 12, after "RNA" insert --; the--;
       line 48, after "A" change the period to a degree sign.

Col. 3, line 22, "aribonucleic" should be --a ribonucleic--;
       line 24, after "over" insert --extended--;
       line 32, "of" (second occurrence) should be --or--;
       line 37, "nucleotides" should be --nucleotide--;

Col. 4, line 57, "theh" should be --the--;

Col. 5, line 7, "vis-a-vizs" should be --vis-a-viz--;
       line 63, "amportant" should be --important--;

Col. 6, line 59, "substtiute" should be --substitute--;

Col. 8, line 20, "to" (first occurrence) should be --in--;
       line 64, after "$\mu$g." insert --RNA per 40 $\mu$g.--
       line 74, "apeparance" should be --appearance--;

Col. 9, line 11, "simulate" should be --stimulate--;
       line 62, after "used" insert --to--;

Col. 10, line 1, "Antisern" should be --Antisera--;
       line 5, omit the period after "w";
       line 7, omit the period after "w";
       line 17, "Glbert" should be --Gilbert--;
       line 30, "MgSO·7H$_2$0" should be --MgSO$_4$·7H$_2$0--;

Col. 11, line 22, "Inc" should be --Ice--;
       line 28, "resusupended" should be --resuspended--;
       line 51, after "transcriptase" (first occurrence) add --(--;

UNITED STATES PATENT OFFICE
CERTIFICATE OF CORRECTION

Patent No. 3,661,893    Dated May 9, 1972

Inventor(s) Solomon Spiegelman and Ichiro Haruna

It is certified that error appears in the above-identified patent and that said Letters Patent are hereby corrected as shown below:

Col. 12, line 8, "(1962)" should be --[1962])--;
   line 75, "smythesis" should be --synthesis--;

Col. 13, line 1 "ony" should be --only--;
   line 4, "and" should be --with--;
   line 10, "PH SPHORYLASE" should be --PHOSPHORYLASE--;
   Table 1, line 9, "$240$" should be --$40^2$--;
        "2" (second occurrence) should be
        --$<2\%$--;
   Table 1, line 10, "$^232$" should be --$32^2$--;
        after each "$<2$" add --%--;
   Table 2, line 2, "O$\beta$" should be --Q$\beta$--;
   line 32, after "RNA" add -ase--;
   line 38, "Replicasee'" should be --Replicase*--;

Col. 14, line 45, "speciifically" should be --specificity--;

Col. 16, line 6, after "80" add --%--;
      "pertrichoracetic" should be --trichloracetic--;
   line 45, "precipitate" should be --precipitable--;

Col. 17, line 4, "tris" should be --Tris--;
   line 5, "Tri" should be --Tris--;
   line 12, "tris" should be --Tris--;

Col. 18, line 70, "stoop-" should be --steep- ---;

Table 6, line 7, move "8" up one line;
   line 7, move "10" up one line;
   line 28, "51γ" should be -- 50λ--;
   line 30, "20γ" should be --20λ--; and change
    "pγ" to -- $P^{32}$--;
   line 36, "resslting" should be --resulting--;
   line 37, "infections" should be --infectious--;
   line 40, "20γ" should be -- 20λ--;

UNITED STATES PATENT OFFICE
CERTIFICATE OF CORRECTION

Patent No. 3,661,893      Dated May 9, 1972

Inventor(s) Solomon Spiegelman and Ichiro Haruna

It is certified that error appears in the above-identified patent and that said Letters Patent are hereby corrected as shown below:

Col. 20, line 66, "was" should be --were--;
         line 73, "MS-72" should be --MS-2--;
         line 74, "NAR" should be --RNA--;

Table 7, line 12, "$00^8$" should be --$10^8$--;

Col. 21, line 49, "H. coli" should be --E. coli--;
        line 60, "B." should be --E.--;

Col. 22, line 19, "11" should be --II--;

Col. 23, Table 8, line 5, "(mm.)" (both occurrences) should be -- ($\mu$M) --;
                    line 25, "4" should be --3--;

Col. 24, line 29, "Merg." should be --Berg,--;

Col. 24, line 52, "of" should be --to--.

Signed and sealed this 27th day of February 1973.

(SEAL)
Attest:

EDWARD M. FLETCHER, JR.           ROBERT GOTTSCHALK
Attesting Officer                 Commissioner of Patents